United States Patent [19]
Ueno et al.

[11] Patent Number: 5,553,069
[45] Date of Patent: Sep. 3, 1996

[54] RADIOCOMMUNICATION SYSTEM

[75] Inventors: Motoharu Ueno, Yokohama; Yoshinari Kumaki; Katsuya Nonin, both of Kawasaki; Eiji Kamagata, Yokohama; Shigeo Matsuzawa, Tokyo, all of Japan

[73] Assignee: Kabushiki Kaisha Toshiba, Kawasaki, Japan

[21] Appl. No.: 282,747

[22] Filed: Jul. 29, 1994

[30] Foreign Application Priority Data

Jul. 30, 1993 [JP] Japan ................................. 5-190269

[51] Int. Cl.⁶ .......................... H04B 7/204; H04L 12/56
[52] U.S. Cl. .................... 370/75; 370/60; 370/60.1; 370/95.1; 370/97; 375/211; 375/267; 375/347; 379/59; 455/13.1; 455/33.1; 455/25; 455/54.2
[58] Field of Search ................... 370/60.1, 95.1, 370/60, 85.1, 75, 76, 69.1, 110.1; 455/13.1–13.3, 331, 7, 11.1, 14, 25, 49.1, 54.1, 54.2, 56.1; 375/211, 267, 347; 379/59, 60, 63

[56] References Cited

U.S. PATENT DOCUMENTS

| | | | |
|---|---|---|---|
| 5,179,559 | 1/1993 | Crisler | 370/95.1 |
| 5,193,091 | 3/1993 | Crisler | 370/95.1 |
| 5,235,598 | 8/1993 | Sasuta | 370/110.1 |
| 5,265,150 | 11/1993 | Helmkamp et al. | 379/58 |
| 5,293,645 | 3/1994 | Sood | 455/54.1 |
| 5,359,603 | 10/1994 | McTiffin | 370/95.1 |
| 5,406,550 | 4/1995 | McTiffin | 370/60.1 |
| 5,408,237 | 4/1995 | Patterson et al. | 455/13.3 |
| 5,434,859 | 7/1995 | Levardon | 370/60 |

OTHER PUBLICATIONS

IEEE Pacific Rim Conference On Communications, Computers and Signal Processing, vol. 1 of 2, pp. 202–205, May 19–21, 1993, J. Haro, et al., "Performance Evaluation Of An ATM Packet Switch For A Future Mobile Broadband Communication Enviroment".

1993 IEEE International Symposium on Circuits and Systems, vol. 4 of 4, pp. 2220–2223, May 1993, N. Umeda, et al., "Performance Improvements In Digital Portable Communications".

IEEE Pacific Rim Conference on Communications, Computers and Signal Processing, vol. 1 of 2, pp. 318–321, May 19–21, 1993, O. Wu, et al., "Supporting User Terminal Mobility Over An ATM/B–ISDN Personal Communications Network".

"A Synchronous Transfer Mode" by Martin De Prycker.

*Primary Examiner*—Hassan Kizou
*Assistant Examiner*—Seema S. Rao
*Attorney, Agent, or Firm*—Oblon, Spivak, McClelland, Maier, & Neustadt, P.C.

[57] ABSTRACT

An ATM-based radiocommunication system adapted for multimedia communication comprises a repeater for providing communication services over a predetermined service area, first radio terminals for communicating with the repeater by using ATM cells, and a second terminal for communicating with the repeater by using ATM cells and communicating with a backbone network. The repeater comprises spot beam transmission and reception antennas for providing radio channels within a predetermined service area by means of spot beams, a wide-area beam transmission and reception antenna for providing a radio channel within the predetermined service area by means of a wide-area beam, first transmitters/receivers connected to the spot beam transmission and reception antennas for transmitting and receiving ATM cells, a second transmitter/receiver connected to the wide-area beam transmission and reception antenna for transmitting and receiving ATM cells, and an ATM switching device having input terminals connected to receive ATM cells from the first and second receivers and output terminals connected to the first and second transmitters for directing incoming ATM cells to their respective proper output terminals.

36 Claims, 14 Drawing Sheets

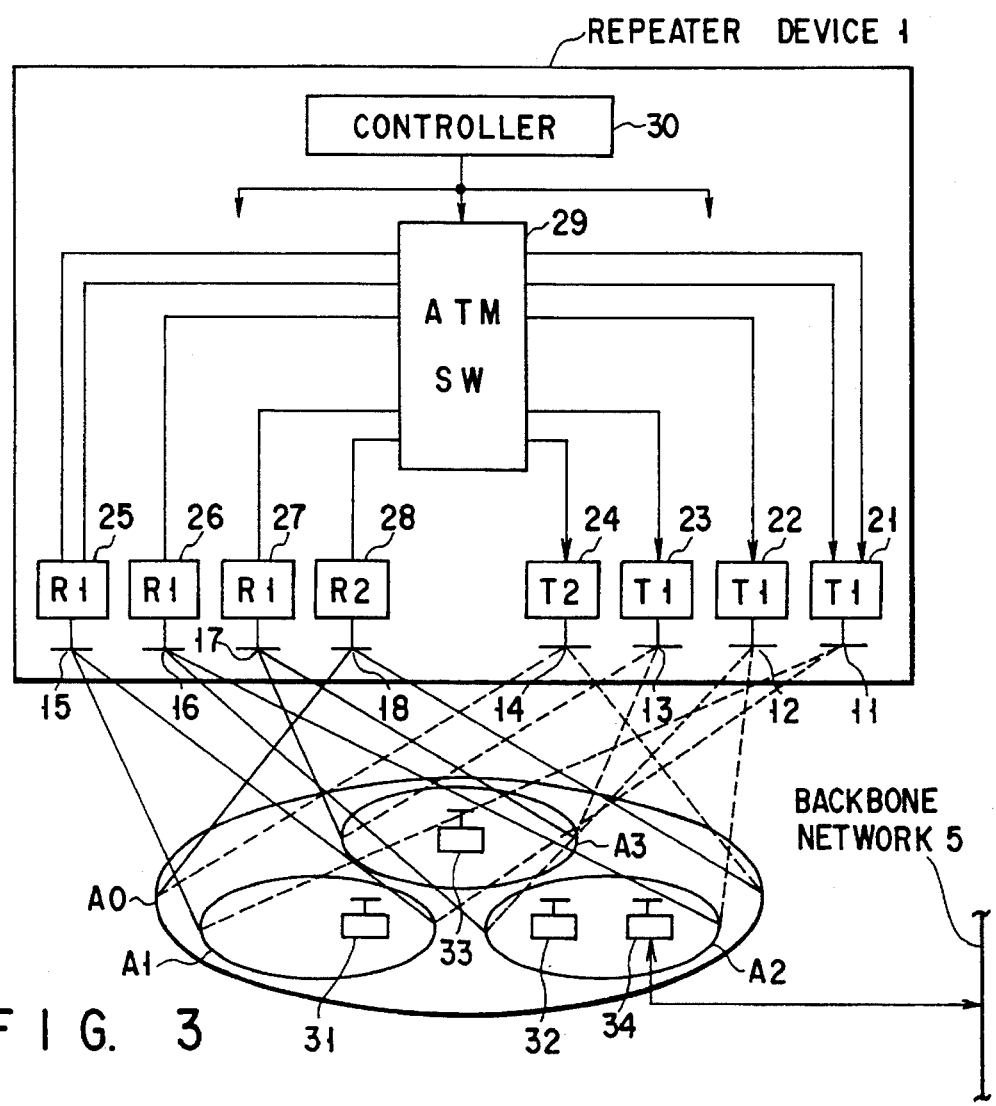
F I G. 3

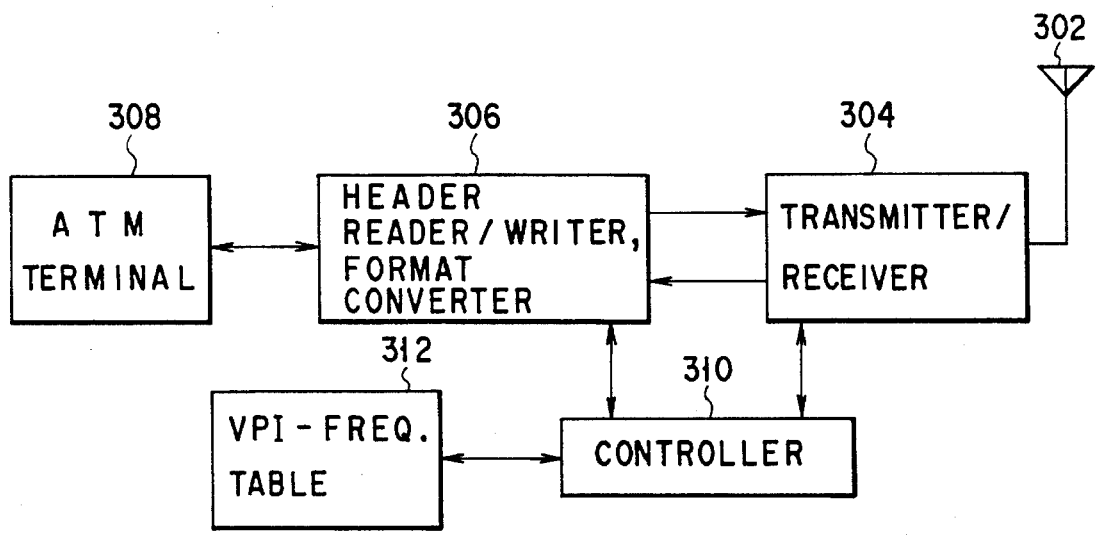
F I G. 4
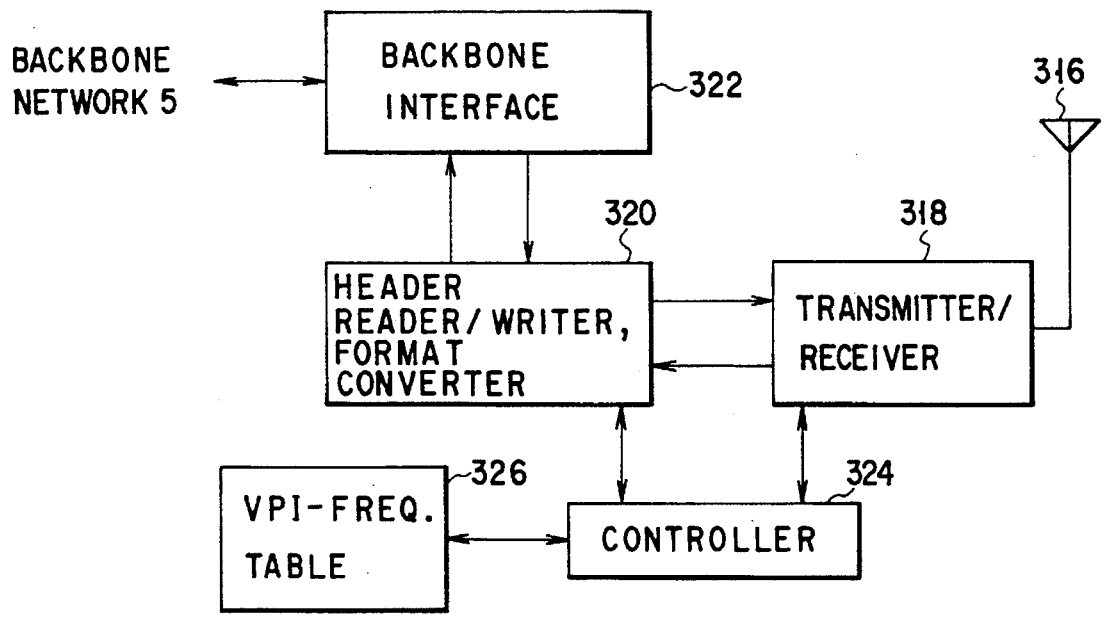
F I G. 5

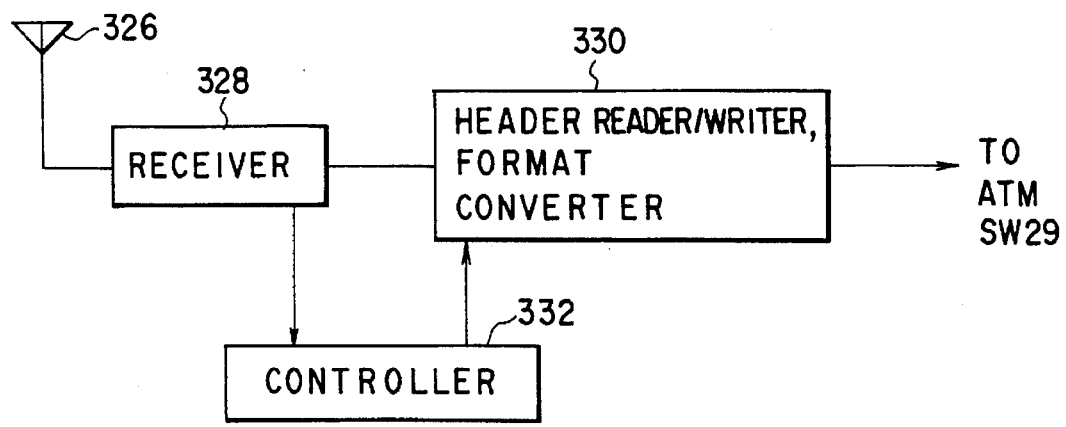
F I G. 6
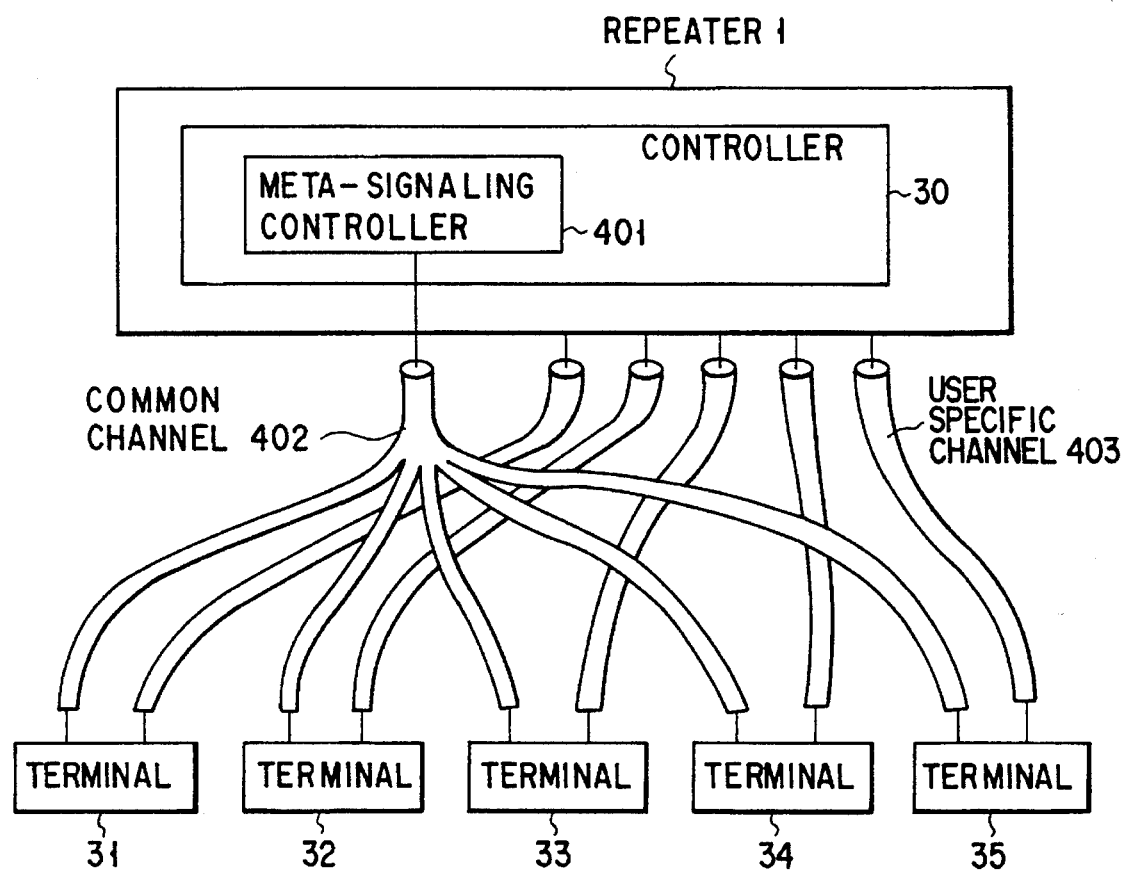
F I G. 7

| FREQUENCY | | AREA | | | |
|---|---|---|---|---|---|
| | | WIDE | SPOT | | |
| | | A0 | A1 | A2 | A3 |
| UP LINK | F0U | ○ | | | |
| | F1U | | ○ | | ○ |
| | F2U | | ○ | | ○ |
| | F3U | | | ○ | |
| | F4U | | | ○ | |
| DOWN LINK | F0D | ○ | | | |
| | F1D | | ○ | | ○ |
| | F2D | | | ○ | |

FIG. 9

| FREQUENCY | | AREA | | | |
|---|---|---|---|---|---|
| | | WIDE | SPOT | | |
| | | A0 | A1 | A2 | A3 |
| UP LINK | F0U | | | | |
| | F1U | | VPI 31 | | |
| | F2U | | | | |
| | F3U | | | VPI 32 | |
| | F4U | | | | |
| DOWN LINK | F0D | VPI 00 | | | |
| | F1D | | VPI 31 | | |
| | F2D | | | VPI 32 | |

FIG. 10

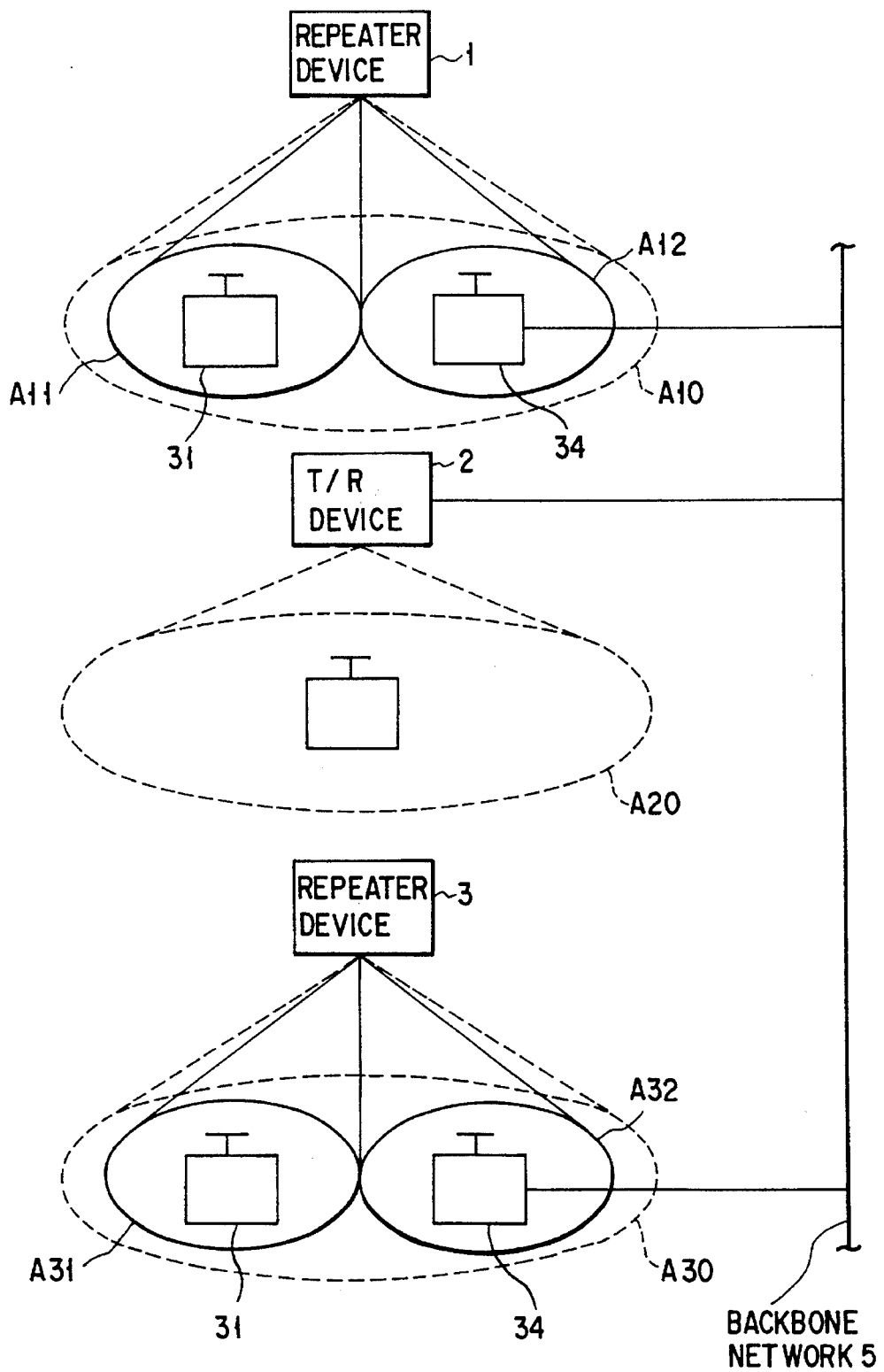
F I G. 16

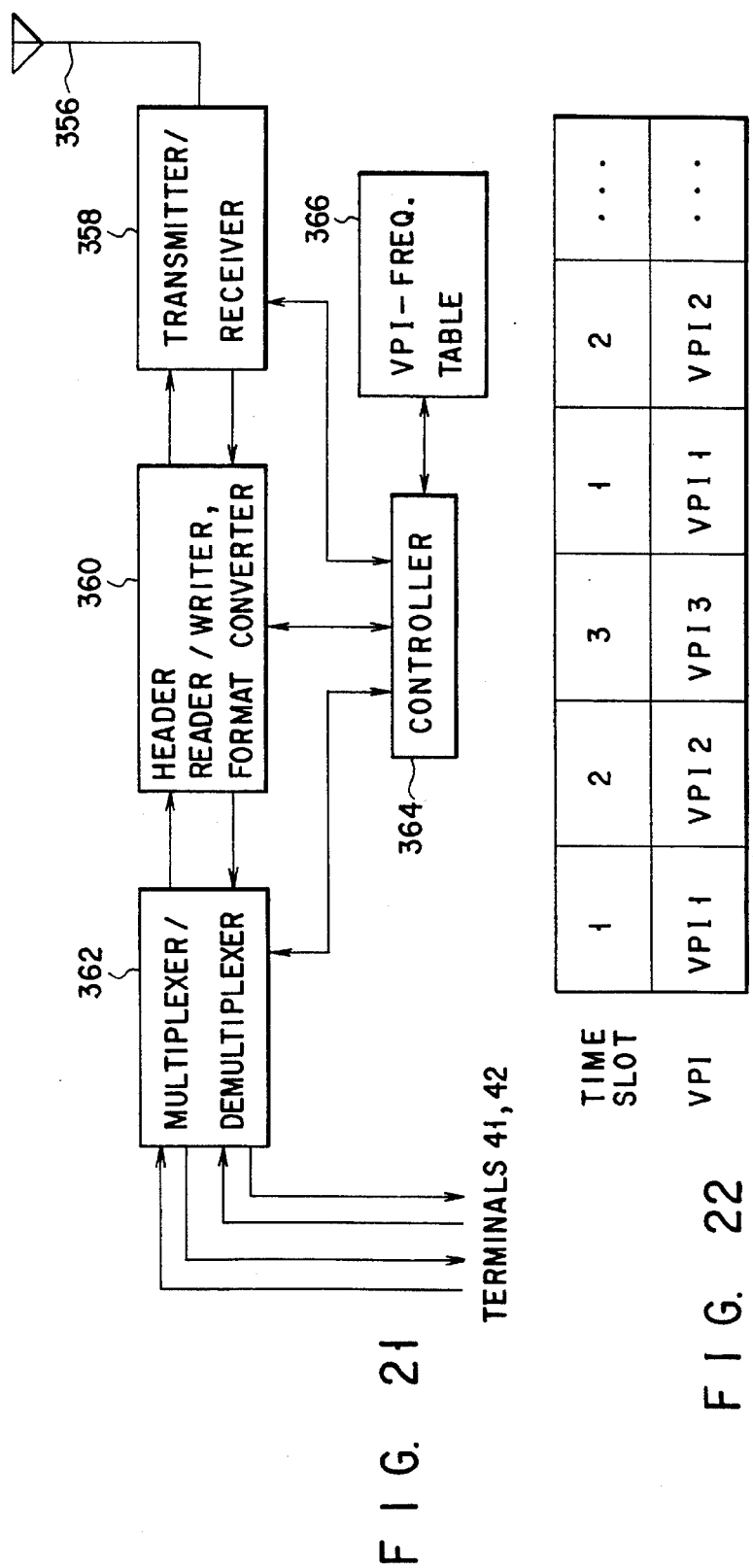
F I G. 21
F I G. 22
F I G. 23

|   | INTER - AREA | | INTRA - AREA | |
| --- | --- | --- | --- | --- |
|   | USE OF THE SAME FREQ. | USE OF THE SAME VPI | USE OF THE SAME FREQ. | USE OF THE SAME VPI |
| 1 | ALLOWED | NOT ALLOWED | NOT ALLOWED | NOT ALLOWED |
| 2 | NOT ALLOWED | NOT ALLOWED | NOT ALLOWED | NOT ALLOWED |
| 3 | NOT ALLOWED | ALLOWED | NOT ALLOWED | NOT ALLOWED |
| 4 | NOT ALLOWED | ALLOWED | NOT ALLOWED | ALLOWED |
| 5 | ALLOWED | NOT ALLOWED | ALLOWED | NOT ALLOWED |
| 6 | ALLOWED | ALLOWED | NOT ALLOWED | NOT ALLOWED |
| 7 | ALLOWED | ALLOWED | NOT ALLOWED | ALLOWED |
| 8 | ALLOWED | ALLOWED | ALLOWED | NOT ALLOWED |
| 9 | ALLOWED | ALLOWED | ALLOWED | ALLOWED |

FIG. 24

RADIOCOMMUNICATION SYSTEM

BACKGROUND OF THE INVENTION

1. Field of the Invention

The present invention relates to a radiocommunication system and, more particularly, to a radiocommunication system which permits multimedia communications for transmission and reception of messages that can contain data, voice, sound and images using an ATM (Asynchronous Transfer Mode) technology.

2. Description of the Related Art

Heretofore, wireless data communications systems have been used in various fields. In recent years, researches and developments have been made in radio LAN technologies which permit a wireless version of a LAN (Local Area Network), in which computer terminals are networked for communications, by the use of radio communications techniques.

FIG. 1 shows a typical radio LAN system. Within beam areas B1 and B2 generated by respective radio transmission/reception devices 801 and 802 having a bridging function for a wire LAN system are placed radio terminals 811, 812; and 821, 822. Through the use of radio channels data communications are performed between the radio transmission/reception device 801 and the radio terminals 811, 812 and between the radio transmission/reception device 802 and the radio terminals 821, 822. By the bridging function of the radio transmission/reception devices 801 and 802, each of the radio terminals 811, 812, 821 and 822 can be connected to a wire LAN system through the elements: (1) the corresponding radio channel, (2) a wire channel between a respective one of the transmission/reception devices 801 and 802 and a backbone communication network 803, and (3) this backbone communication network. Thereby, each radio terminal is permitted to receive various services from the wire LAN system. The radio terminals are also permitted to communicate with each other directly or through the radio transmission/reception devices. In particular, the use of the radio transmission/reception device permits transmission and reception of data between radio terminals located within different beam areas.

One of technical problems with a LAN system lies in increasing the transmission rate. The upper limit of the transmission rate in a representative wire LAN system now in wide use is on the order of 10 Mbps. To transmit various messages that can contain data, images, voice and sound, i.e., multimedia information, a faster LAN system is required. To build such a fast LAN system, researches and developments have been made in what is referred to as an ATM-LAN system which uses an ATM technique in a wire LAN system. The ATM is a technique which allows the transmission and exchange of information in uniform-sized packets which are called cells with each cell having a header and an information field.

FIG. 2 shows an example of an ATM-LAN. To an ATM switch 900 are connected ATM terminals 901, 902 and a bridge 903. The bridge 903 is also connected to a backbone network 904. The ATM terminals 901 and 902 each perform cell assembly procedure based on all information to be transmitted and add information indicating a destination, i.e., a virtual path identifier (VPI) and a virtual channel identifier (VCI), to the header of each cell before transmission. The information field of each cell is referred to as a pay-load part. Each cell entered into the ATM switch 900 is directed to a path determined according to the values of the identifiers, then transmitted to its destination terminal. The destination terminal performs a cell disassembly procedure to take out the original information field (pay-load part) from the cell. The ATM terminals 901 and 902 can be connected by the bridge 903 to the backbone network 904.

Even in the radio LAN system, on the other hand, a demand for multimedia information communication is increasing. To permit the radio LAN system to perform multimedia information communication, it is required to speed up data transmission by using the ATM technique as in the wire LAN system.

To build such a radio ATM-LAN, its adaptability to a wire ATM-LAN is important. That is, the major problems with the radio ATM-LAN lie in how to incorporate the function of the ATM-LAN which has been considered exclusively as the wire LAN into the radio ATM-LAN and how to match the function unique to the radio LAN system to the ATM-LAN system. To be more specific, the major problems are: (1) how to make the radio ATM-LAN accommodate itself to the movement of radio terminals unique to a radio communication system while making full use of features of a multimedia communication; and (2) how to perform the meta-signaling procedure required for an ATM communication.

Hereinafter, these problems will be described.

The basis of the ATM communication system is to perform as little complex flow control and error correction as possible in order to implement fast transmission/exchange of information. One of backgrounds that make it possible is the use of good transmission lines such as optical fibers. However, it is hard to say that radio channels always have good transmission characteristics. Especially in a room where a radio ATM-LAN system would be used, degradation of transmission path characteristics due to multi-path reflection of electromagnetic waves will generally be significant. For this reason, the transmission path characteristics must be improved in the first place. To compensate for degradation of transmission path characteristics, use has conventionally be made of a system in which an antenna system is improved, such as a diversity reception system, a signal processing technique for processing signals on a time axis using a waveform equalizer, etc. If, however, a high transmission rate is required, a very high operating speed will be required of a signal processing circuit for improving transmission path characteristics, which involves technical and economic difficulties. Thus, an improvement by the antenna system will be demanded.

One of ways to improve the transmission path characteristics with an antenna system is to use a beam by narrowing an antenna beam. The use of a beam permits faster transmission than with a wide beam which is a diverging beam. If, however, a beam is used, the service area of an antenna will be limited, which limits the movement of radio terminals. To solve this problem, use is made of a so-called microcell or picocell system which covers a necessary service area with plural beams from plural antennas. However, this approach is not necessarily sufficient to solve the problem.

The ATM communication system, which is based, as described above, on performing as little complex flow control and error correction as possible, needs connection admission control in which each terminal reports service parameters, such as transmission rate and quality, to the network and has the report accepted prior to information transmission for the purpose of guaranteeing transmission quality. To set up, inspect and open a control channel (Signaling Virtual Channel; SVC) for performing this connection admission control, a meta-signaling procedure is performed. In a wire ATM-LAN, since terminals are connected to each other by wire channels, a physical medium (wire channel) can be used in common for a medium for transmitting data at 155.520 Mbps and a medium for transmitting an SVC and a meta-signaling signal.

As in the wire communication system, in the radio ATM-LAN as well, it may be considered to use a physical medium (radio channel) in common for a medium for transmitting data at 155.520 Mbps and a medium for transmitting an SVC and a meta-signaling signal. In the radio ATM-LAN, however, the assignment of a radio channel having a transmission rate of 155.520 Mbps to a radio terminal with each meta-signaling procedure would result in reduced efficiency of frequency utilization. Further, to implement a transmission rate of 155.520 Mbps with a radio communication system, it would be required to use a beam suited for high-speed transmission. To perform the meta-signaling procedure with a beam that is small in service area, it would be required to know previously and accurately which of beam areas a radio terminal that desires to communicate is located in. This involves difficulties.

A technique for providing the continuity of communication service when a radio terminal moves from an area to another includes a hands-off technique. The conventional hands-off technique is directed to a communication system which, like an automobile telephone system, is relatively low in transmission rate and makes no use of the ATM technique. In the radio ATM-LAN as well, therefore, the hands-off technique is one of the technical subjects to be considered.

Moreover, an important problem with a radio communication system is how to share a limited number of transmission paths (radio channels) among radio terminals. As can been seen from FIG. 2, in the wire communication system, each of the terminals 901 and 902 occupies its corresponding respective transmission path to the ATM switch 900. In the radio communication system, on the other hand, the system configuration is generally such that a transmission path is shared among a plurality of radio terminals as shown in FIG. 1. As a technique for sharing a transmission path among a plurality of radio terminals in the radio communication system, use has been made of a multi-access technique such as FDMA (Frequency Division Multiple Access), TDMA (Time Division Multiple Access), or CDMA (Code Division Multiple Access). These techniques perform exclusive assignment of resources (hereinafter referred to as radio resources), such as frequency, time, and code, which can be used in a radio communication system, thereby permitting a transmission path to be shared.

Normally, the exclusive assignment of the radio resources is performed on the terminal level. That is, a terminal that set up a call is exclusively assigned part of the radio resources. In the case of the radio ATM-LAN, however, the exclusive assignment of radio resources on the terminal level as in conventional radio communication systems is not desirable in order to make much use of the features of the ATM-LAN: (1) it can accommodate variable transmission rates; and (2) one terminal is permitted to use multiple connections in order to adapt itself to multimedia communications, and in order to maintain compatibility with the conventional wire ATM-LAN. For example, to accommodate variable transmission rates, it is required to change the transmission bandwidth of a radio resource. Assignment of a radio resource for each individual radio terminal would not permit the transmission bandwidth to be changed flexibly. In principle, a single radio terminal uses a single radio resource, which does not permit the radio terminal to use multiple communication I/O connections for the purpose of transmitting multimedia information.

In addition to assignment of radio resources for sharing transmission paths, use has been made of a frequency reutilization technique which, particularly when a radio resource is a frequency, permits a more efficient utilization of it. This technique uses the above-mentioned spot-beam-based picocell system in view of efficient utilization of frequency. That is, in the picocell system, the same frequency is used in two or more beam areas in which no wave interference occurs or mutual influence of wave interference is permissible. For the whole service area, the frequency reutilization technique permits an increase in the number of available frequencies. However, for the movement of a radio terminal from an area to another area in which a different frequency is used, an additional hands-off technique for dynamic frequency assignment/switching will be needed. Although a hands-off technique adapted for zones of the size of the order of several kilometers has been proposed, no hands-off technique effective for a picocell system of the order of several meters has been proposed yet.

In the radio ATM-LAN, it will be supposed that a radio terminal moves between areas where communication services of the same quality are available or moves to another area where the same services are available by way of an area in which only low-quality services are available or an area where no service is available. For example, it will be considered that a radio-terminal user suspends the use of the radio ATM-LAN in an office, then moves to another office via a corridor where no communication services are available and immediately resumes the use of the radio ATM-LAN. Heretofore, as a technique which permits the continuation of the use of a function regardless of the suspension of the use of it, such a resume facility as applied to personal computers is known. In the radio ATM-LAN, an implementation of such a resume facility supposing the movement of radio terminals will become an important subject. However, such a technique has not been applied yet.

As described above, problems with the conventional radio ATM-LAN techniques are that the use of beams for implementing good transmission path characteristics and a high transmission rate makes restrictions on the movement of radio terminals and moreover makes the meta-signaling procedure difficult to perform.

Moreover, if, when the multi-access technique is applied to the radio ATM-LAN to share transmission paths, exclusive assignment of radio resources were performed on the terminal level as in the prior art radio communication system, it would be impossible to make much use of the features of ATM-LAN which can accommodate variable transmission rates and multimedia communications. In addition, a problem would arise in maintaining compatibility with the conventional wire ATM-LAN.

Furthermore, in the prior art techniques, how to implement a hands-off technique and a resume facility for the movement of radio terminals in the radio ATM-LAN has not been found out.

SUMMARY OF THE INVENTION

Accordingly, it is an object of the present invention to provide a radio communication system which allows the movement of radio terminals that communicate with one another through transmission and reception of ATM cells while increasing the transmission rate of radio channels and permits a meta-signaling procedure unique to ATM technique to be performed easily through a radio channel.

A related object of the present invention is to provide a radio communication system which can make much use of the features of an ATM system, realized in a conventional wire ATM-LAN, that permit variable transmission rates and multimedia communications, and can maintain compatibility with the wire ATM-LAN.

A further object of the present invention is to provide a radio communication system which can implement a hands-off/resume facility to accommodate the movement of radio terminals which communicate with one another through transmission and reception of ATM cells.

According to the present invention, there is provided a radiocommunication system comprising:

a repeater for providing a radiocommunication service over a predetermined service area; and a radiocommunication terminal for communicating with the repeater, the repeater comprising:

first communicating means for providing a radio channel by a wide beam covering the whole of the service area; and second communicating means for providing a radio channel by spot beams covering subareas within the service area.

According to the present invention, there is provided another radiocommunication system comprising:

a repeater for providing a radiocommunication service over a predetermined service area; and a radiocommunication terminal for communicating with the repeater using an ATM cell, the repeater comprising:

communicating means for providing a radio channel by a wide beam covering the whole of the service area; and ATM switching means connected to the communicating means.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 3 shows a radio communication system according to a first embodiment of the present invention;

FIG. 4 is a simplified block diagram of a first radio terminal;

FIG. 5 is a simplified block diagram of a second radio terminal;

FIG. 6 is a block diagram of a receiver in the repeater of FIG. 3;

FIG. 7 shows conceptually a connection setup facility including a meta-signaling procedure;

FIG. 9 shows a correspondence between beam areas and frequencies assigned to the respective areas;

FIG. 10 shows a correspondence between frequencies assigned to beam areas and VPIs;

FIG. 16 shows a radio communication system according to a second embodiment of the present invention;

FIG. 21 is a simplified block diagram of a third terminal in the fourth embodiment shown in FIG. 18;

FIG. 22 is a diagram for use in explanation of multi-access means in time domain;

FIG. 23 is a diagram for use in explanation of multi-access means in code domain; and FIG. 24 is a diagram for use in explanation of assignment of VPIs and radio resources.

DETAILED DESCRIPTION OF THE PREFERRED EMBODIMENTS

Figure 1:
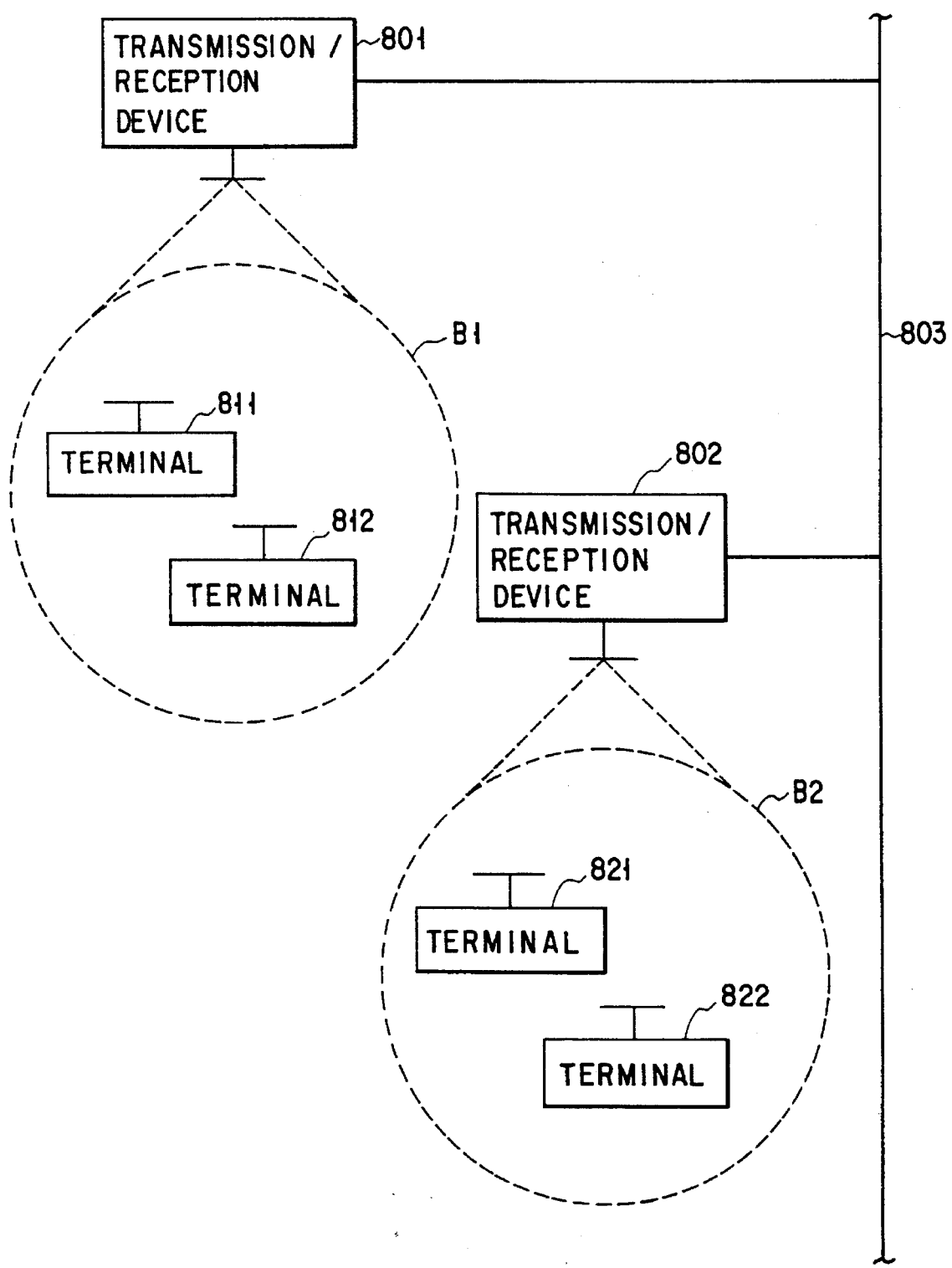
FIG. 1 shows a conventional radio LAN.
Figure 2:
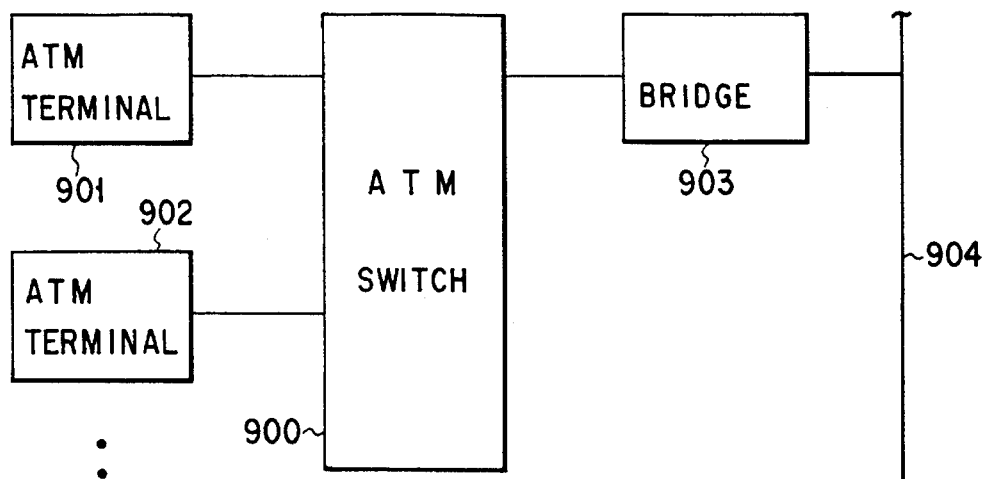
FIG. 2 shows a conventional wire ATM-LAN.

A preferred embodiment of a radiocommunication system according to the present invention will now be described with reference to the accompanying drawings. The present invention includes the following four items:

(a) hardware configuration (physical layer configuration);

(b) setup of connections;

(c) assignment of ATM layers and radio channels; and (d) hands-off/resume facility.

Each of these items will be described below.

(a) Hardware configuration of radio communication system

FIG. 3 shows a radio communication system according to an embodiment of the present invention. This radio communication system forms a radio ATM-LAN and comprises first radio terminals 31 to 33, and a second radio terminal 34. Each of the first radio terminals 31 to 33 performs multimedia communication that contains data, voice, sound and video with radio repeater device 1 through transmission and reception of ATM cells. Like the first radio terminals, the second radio terminal 34 performs multimedia communication with the repeater 1 through transmission and reception of ATM cells. In addition, the second radio terminal 34 is adapted to communicate with a backbone network 5. More than one repeater may be provided.

The first radio terminals 31 to 33 have the same arrangement, with an example being shown in FIG. 4. An antenna 302 is connected to a radio transmitter/receiver 304. A receive signal is applied via a header reader/writer-format converter 306 to a conventional (wire) ATM terminal 308. To the transmitter/receiver 304 and the header reader/writer-format converter 306 is connected a controller 310 to which a VPI-frequency correspondence table 312 is connected. ATM cell identifiers include VPIs and VCIs. Suppose here that only VPIs are used. A transmit signal from the ATM terminal 308 is applied to the antenna 302 via the header reader/writer-format converter 306 and the transmitter/receiver 304.

An exemplary arrangement of the second radio terminal 34 is shown in FIG. 5. An antenna 316 is connected to a radio transmitter/receiver 318. A receive signal is applied to backbone network 5 via a header reader/writer-format converter 320 and a backbone interface 322. To the radio transmitter/receiver 318 and the header reader/writer-format converter 320 is connected a controller 324 to which a VPI-frequency correspondence table 326 is connected. A transmit signal from the backbone network 5 is applied to the antenna 316 via the backbone interface 322, the header reader/writer-format converter 320, and the transmitter/receiver 318.

Referring back to FIG. 3, the repeater 1 comprises a wide beam transmitting antenna 14 and a wide beam receiving antenna 18 which provide a radio channel within a predetermined service area by means of a single wide beam A0, spot beam transmitting antennas 11 to 13 and spot beam receiving antennas 15 to 17 which provide radio channels within the service area by means of a plurality of spot beams A1 to A3 which are narrower than the wide beam and cover a smaller area (in the example shown, three beams are illustrated for convenience of illustration only), first transmitters 21 to 23 respectively connected to the spot beam transmitting antennas 11 to 13 for transmitting ATM cells, first receivers 25 to 27 respectively connected to the spot beam receiving antennas 15 to 17 for receiving ATM cells, a second transmitter 24 connected to the wide beam transmitting antenna 14 for transmitting ATM cells, a second receiver 28 connected to the wide beam receiving antenna 18 for receiving ATM cells, an ATM switching device 29, and a controller 30. The wide beam transmitting antenna 14 and receiving antenna 18 provide a single wide beam cover the predetermined area. In the case of FIG. 3, the first radio terminals 31, 32 and 33 are located in the spot beam areas A1, A2, and A3, respectively, and the second radio terminal 34 is located in the spot beam area A2. The ATM switching device 29 may comprise a VPI/VCI conversion function and a branching/insertion function of control cells in addition to a ATM cell switching function. It is possible to use a single transmitting/receiving antenna instead of the wide beam transmitting antenna 14 and wide beam receiving antenna 18. It is also possible to use three transmitting/receiving antennas instead of the spot beam transmitting antennas 11 to 13 and spot beam receiving antennas 15 to 17.

The first receivers 25, 26 and 27 and the second receiver 28 have the same arrangement, an example of which being shown in FIG. 6. An receiving antenna 326 is connected to a radio receiver 328. A receive signal is applied via a header reader/writer-format converter 330 to the ATM switching device 29 as ATM cells. A controller 332 is connected to the receiver 328 and the header reader/writer-format converter 330.

ATM switching device 29 has a plurality of input terminals for receiving ATM cells from the receivers 25 to 28 and a plurality of output terminals for delivering ATM cells to the transmitters 21 to 24 and performs a switching process of directing each of incoming ATM cells to its proper output terminal. Controller 30 controls the transmitters 21 to 24, the receivers 25 to 28, and the ATM switching device 29.

(b) Setup of connections

Next, as an example of a method for setting up a connection between transmitting and receiving radio terminals, a method of setting up a signaling virtual channel (SVC) serving as a control channel for controlling connections and a meta-signaling procedure for setting up the SVC will be described. Here, only VPI will be regarded as an identifier for defining an ATM connection for the purpose of simplifying the description of a method for establishing a correspondence between an ATM connection and a radio channel (radio resource).

Figure 8:
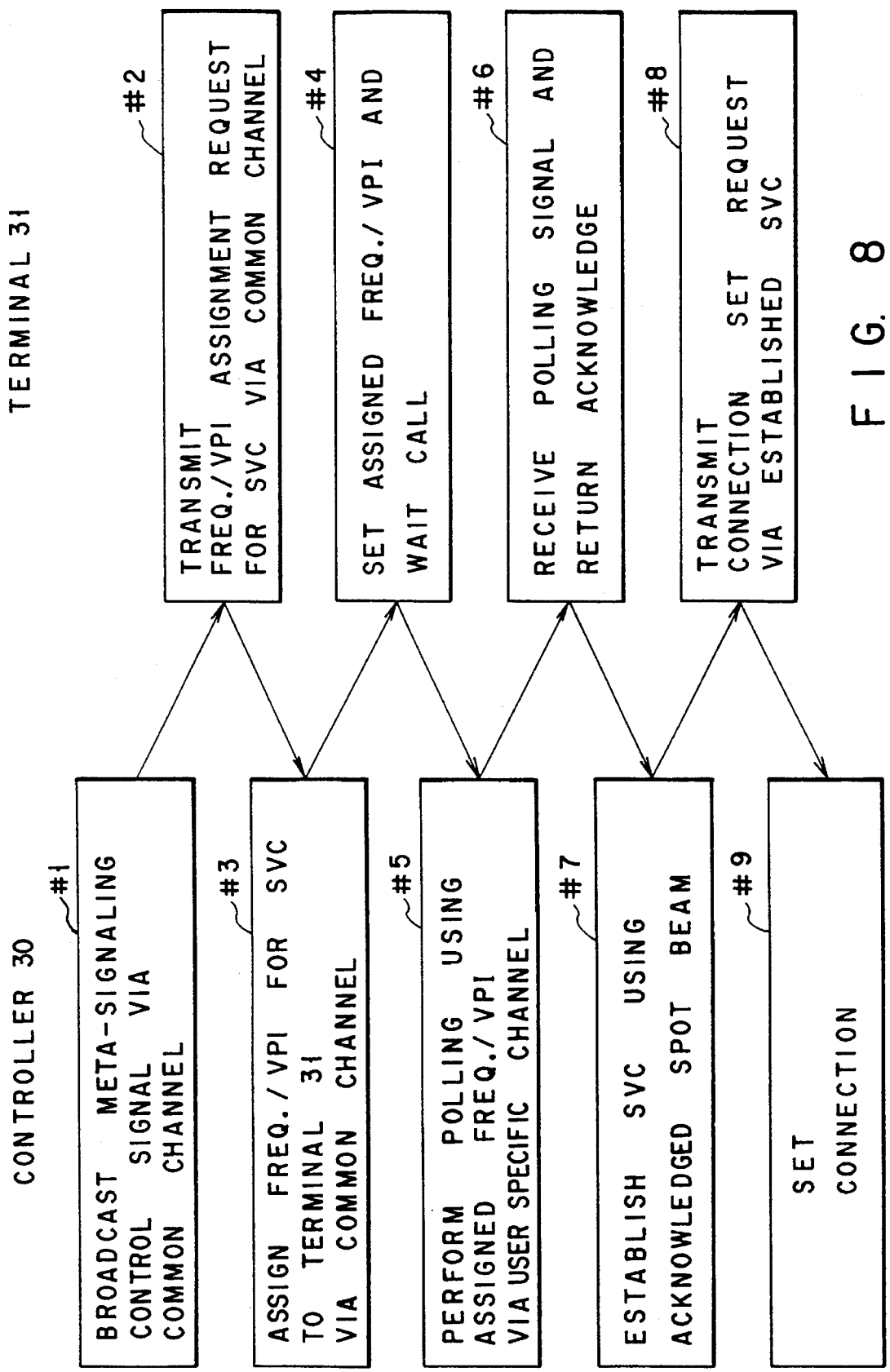
FIG. 8 shows a connection setup procedure including the meta-signaling procedure.

FIG. 7 shows conceptually the meta-signaling procedure in the present embodiment, and FIG. 8 shows the connection setup procedure including that meta-signaling procedure. The present embodiment basically uses a radio channel (wide-beam-based radio channel) provided by the wide beam area A0 shown in FIG. 3 as a common control channel 402 for meta-signaling. A request for VPI for SVC is made via this common control channel 402. As shown in FIG. 3, the first radio terminals 31, 32, and 33 are respectively located in the spot beam areas A1, A2, and A3. The radio channels (spot-beam-based radio channels) provided by these spot beam areas A1, A2 and A3 are used as user specific channels 403 between the repeater 1 and the radio terminals 31 to 35. That is, the repeater 1 uses the user specific channels 403 to set up connections among the radio terminals 31 to 33 as requested by the radio terminal 31.

First, a meta-signaling controller 401 in the controller 30 of the repeater 1 broadcasts a meta-signaling control signal to the radio terminals via the wide-beam-based radio channel, i.e., the common control channel 402 having predetermined frequency and VPI, for example, F0D and VPI00 shown in FIG. 10 to be described later (step #1).

Upon receipt of the meta-signaling control signal, the radio terminal 31 transmits an SVC frequency/VPI assignment request via the common control channel 402, for example, on a random access basis (step #2).

The controller 30 assigns unused frequency/VPI for SVC to the first radio terminal 31 via the wide-beam-based radio channel (step #3).

The radio terminal 31 sets the assigned frequency/VPI for SVC and is placed in the reception wait state (step #4).

Using the first transmitters 21 to 23, the controller 30 polls the radio terminals on the basis of the assigned frequency/VPI for SVC (step #5).

The first radio terminal 31 receives the polling signal and acknowledges it (step #6).

Thereby, the controller 30 is permitted to determine that the radio terminal 31 is located in the spot beam area A1. Thus, SVC is established between the repeater 1 and the first radio terminal 31 (step #7).

Next, the first radio terminal 31 makes a request to the repeater that a connection be set up between the terminals 31 and 32 (step #8).

In response to this request, the repeater controller 30 sets up connections among the first radio terminals 31 to 33 (step #9).

(c) Assignment of ATM layers and radio channels

The ATM system is basically hierarchized into three layers: the physical layer, ATM layer and ALL layer. The lowermost physical layer provides transmission resources for transmitting ATM cells, the ATM layer provides a logical connection of two layer at VP/VC levels and the ALL layer performs cell assembly procedure and cell disassembly procedure. In the radio ATM-LAN, the first subject is how to organize and provide the physical layer, i.e., radio channel resources for transmitting ATM cells. To be specific, how to organize a predetermined service area, i.e., a beam area formed by an antenna, is determined first. This is determined in terms of required transmission rate, mobility requirements, efficient utilization of used frequencies, communication control scheme, etc.

For this subject, the present invention provides a predetermined service area by the use of two types of beam areas; spot beam areas formed by more than one spot beam antenna, and a wide beam area formed by a wide beam antenna. In the example of FIG. 3, the three spot beam areas A1 to A3 by the spot beam antennas 11 to 13 and 15 to 17 and the wide beam area A0 by the wide beam antennas 14 and 18 form two types of beam areas. As will be described later, either the spot beam areas or the wide beam area may be used to cover a predetermined service area.

How to implement multi-access to that service area will be described, which is most important for sharing a radio channel in a radio communication system. As described above, multi-access techniques include FDMA, TDMA, and CDMA. In the present embodiment, the FDMA technique is used, and hence the multi-access is made on a frequency domain basis.

Referring now to FIG. 9, there are illustrated frequencies used for uplinks in the wide beam area A0 and the spot beam areas A1 to A3, i.e., the radio channels directed from the radio terminals 31 to 34 to the repeater 1, and downlinks, i.e., the radio channels from the repeater 1 to the radio terminals 31 to 34. FIG. 9 shows an example in which five frequencies F0U, F1U, F2U, F3U, and F4U are assigned to the uplinks and three frequencies F0D, F1D, and F2D are assigned to the downlinks. As shown, in each of the spot beam areas A1, A2 and A3, two frequencies are assigned for uplink, while one frequency is assigned for downlink. Each of frequencies F1U, F2U and F1D is shared between spot beam areas A1 and A3. The radio resources for adapting ATM to a radio communication system are organized in this manner.

The ATM system is a connection-oriented transmission system and needs to set up a connection between transmitting and receiving terminals prior to transmission of information. To be specific, by setting up identifiers to be added to ATM cells which terminals transmit or receive, VP/VC levels of transfer function (ATM connection) is realized. The identifiers each have a hierarchy of VPI and VCI in correspondence with the two-level ATM layer with VP and VC levels and are added to the headers of ATM cells for transmission.

A unique, important problem arises in the radio ATM-LAN system in that how the radio channels are made to correspond with the ATM connection which has been set up. In the present invention, basically at least one of VPI and VCI, an identifier for defining ATM connection, is made to correspond with a radio resource (for example, frequency) assigned to the wide beam area and spot beam areas, thereby establishing a correspondence between an ATM connection and a radio channel.

Hereinafter, only VPI is regarded as an identifier that defines an ATM connection for the purpose of simplifying the explanation of the way to establish a correspondence between ATM connections and radio channels (radio resources). As shown in FIG. 3, the first radio terminals 31 to 33 are located in the spot beam areas A1 to A3. Suppose here that VPI31 and VPI32 are set up for ATM cells transmitted from the radio terminals 31 to 33. Assignment of frequency as a radio resource is assumed as shown in FIG. 10. The connection setup method itself is the same as that described in connection with paragraph (b).

Figure 11:
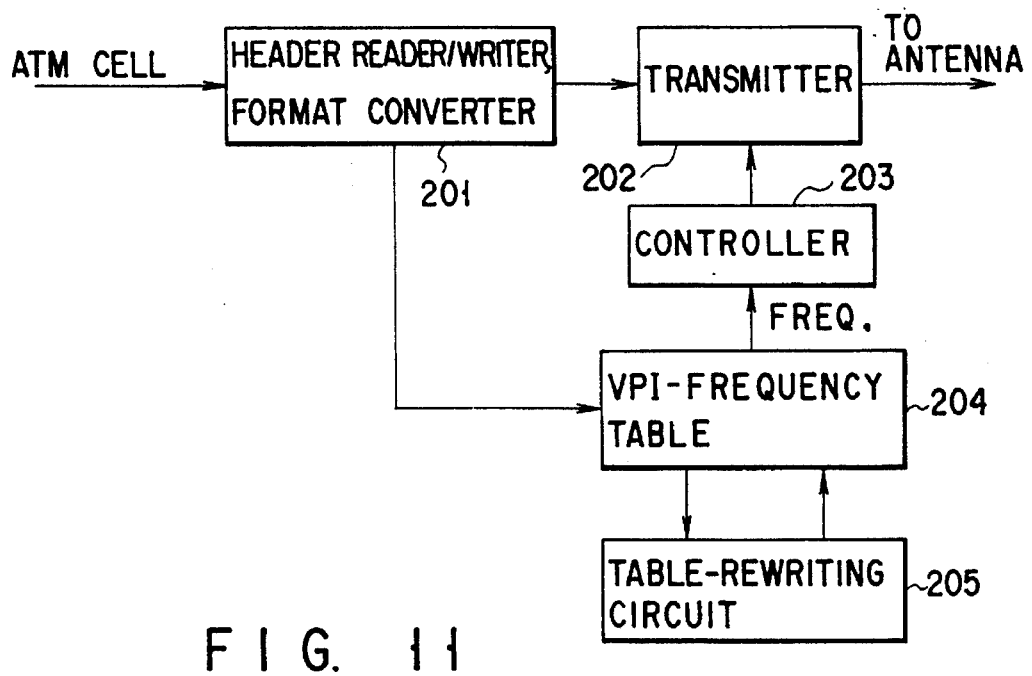
FIG. 11 is a block diagram of a transmitting section of a first transmitter or a first radio terminal.

Reference will now be made to FIG. 11 to describe that method taking by way of example information transmission from the first radio terminal 31 located in the spot beam area A1 to the first radio terminal 32 located in the spot beam area A2. FIG. 11 shows the major components of a transmitting section in the first transmitters 21 to 23, the first radio terminals 31 to 33 and the second radio terminal 34.

In the radio terminal 31, information to be transmitted is formed into cells by a cell assembly section not shown. Each cell is added with VPI in its header, then entered into a header reader/writer-format converter 201. In this header reader/writer-format converter 201, an incoming ATM cell is subjected to header reading/writing and format conversion. The header is entered into a VPI-frequency correspondence table 204, and the format-converted ATM cell is fed via a radio transmitter 202 to an antenna not shown. The format conversion means the inclusion of ATM cells in a radio frame (transformation of ATM cells into packets). VPI-frequency correspondence table 204 stores such a correspondence relationship between VPIs and frequencies as shown in FIG. 10 and outputs frequency information corresponding to a VPI included in incoming header. The VPI-to-frequency correspondence relationship in the VPI-frequency correspondence table 204 is rewritable by a table-rewriting circuit 205 under the control of the repeater 1 via the common channel/user specific channel. The frequency information output from the table 204 is fed into a controller 203 adapted to control a transmitting frequency of the transmitter 202. From FIG. 10 it will be seen that the VPI in ATM cells at the radio terminal 31 is VPI31. Thus, the transmitting frequency is set to F1U. That is, the radio terminal 31 transmits ATM cells to the repeater 1 on the frequency F1U.

In the repeater 1, the first receiver 25 receives the radio-framed ATM cells through the spot beam receiving antenna 15, which, in turn, are entered into the ATM switching device 29. The ATM switching device 29 changes the VPI in the received ATM cells to VPI32 as required and then directs the received ATM cells to the output terminal connected to the transmitter 22. The transmitter 22 transforms ATM cells from the ATM switching device 29 into frames and transmits the frames through the spot beam transmitting antenna 12 on the frequency F2D. The ATM cells transmitted by the transmitter 22 are received by the radio terminal 32, so that information is reproduced. Thus, information communication is permitted between the radio terminals 31 and 32.

Further, if an ATM connection is set up between the second radio terminal 34 that is located in the spot beam area A2 and connected to the external backbone network 5 and the first radio terminal 31 that is located in the spot beam area A1 in accordance with the same procedure, then the radio terminal 31 will be permitted to communicate with the external communication system.

(d) Hands-off/resume facility

In the radio LAN, it will be supposed that a radio terminal located in a beam area sets up a connection with another terminal, then moves to another beam area without releasing that connection. A technique for allowing a radio terminal to move to another beam area even if it does not release the connection set up before the movement, i.e., a hands-off/resume facility, will be described with reference to FIGS. 12 through 15.

Figure 12:
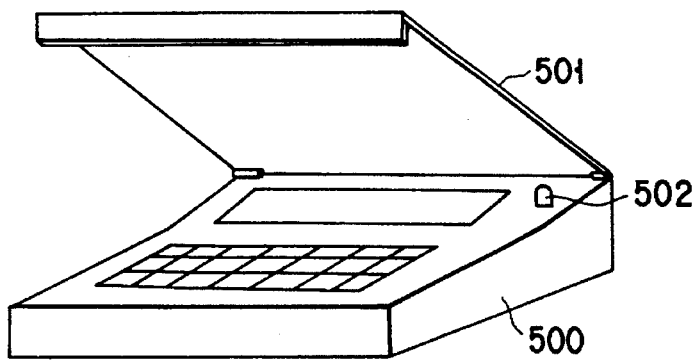
FIG. 12 is a diagram for use in explanation of an exemplary way to detect the start of movement of a radio terminal.
Figure 13:
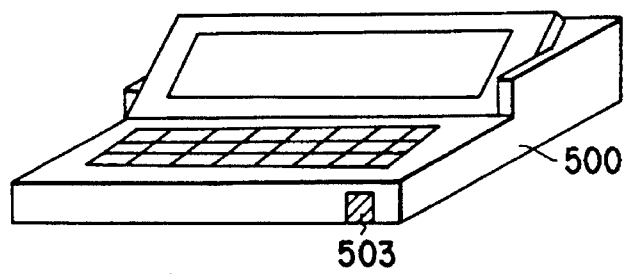
FIG. 13 is a diagram for use in explanation of another exemplary way to detect the start of movement of a radio terminal.
Figure 14:
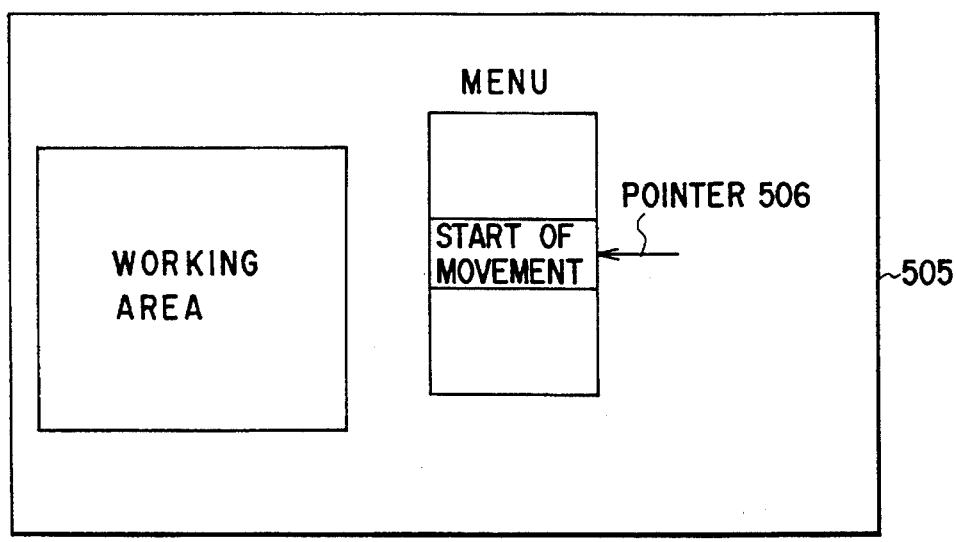
FIG. 14 is a diagram for use in explanation of still another exemplary way to detect the start of movement of a radio terminal.

FIGS. 12, 13 and 14 illustrate various means adapted to detect the start of movement of a radio terminal and signal the repeater 1.

An example shown in FIG. 12 is based on the fact that a user will normally close the cover of a radio terminal before starting movement. That is, a sensor 502 is provided for detecting closing of the cover 501 of a terminal 500 by the user to know the start of movement of the terminal. The result is signaled to the repeater 1 by the use of SVC.

In an example of FIG. 13, a terminal 500 is equipped with a sensor 503, such as a gyroscope, for detecting that the terminal 500 is being lifted or moved. Thus, the terminal 500 is permitted to signal its movement or its start of movement through the use of SVC.

In the example of FIG. 14, when starting movement, a user chooses the start-of-movement command on the menu displayed on the screen 505 of a radio terminal with a pointer 506. In this case as well, the start of movement is signaled to the repeater 1 through the use of SVC.

Figure 15:
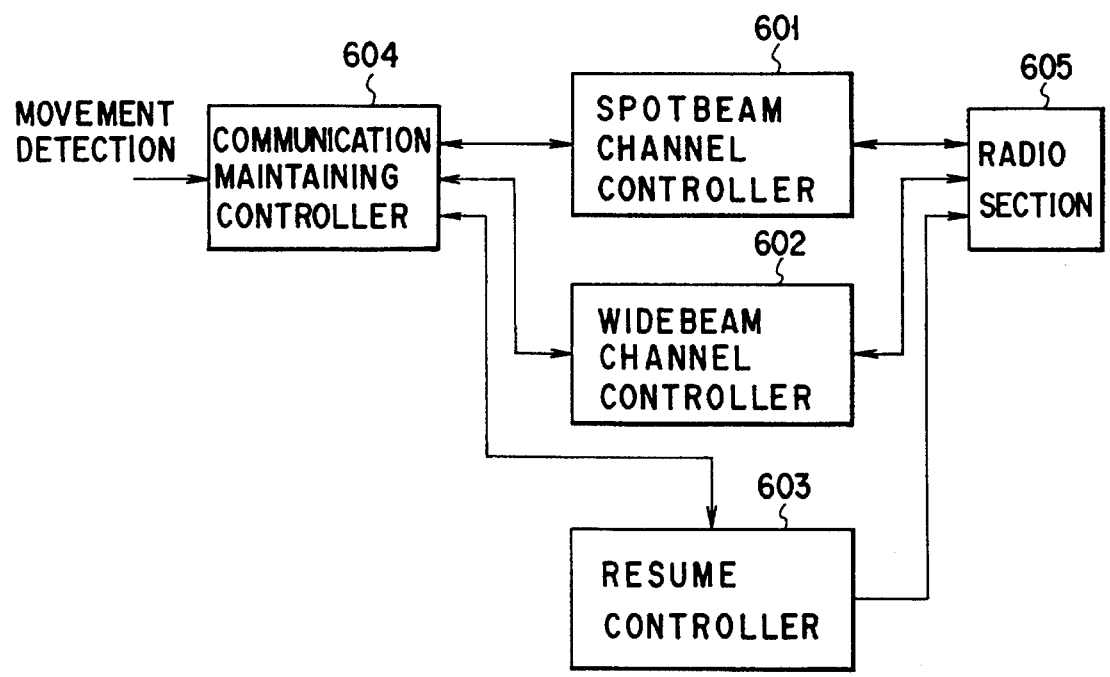
FIG. 15 is a conceptual diagram of a hands-off/resume facility.

FIG. 15 is a block diagram illustrating conceptually the arrangement associated with the hands-off/resume facility of a radio terminal, which comprises a spot beam channel setup/release controller 601, a wide beam channel setup/release controller 602, a resume controller 603, a communication maintenance controller 604, and a radio section 605.

Suppose, for example, that the radio terminal 31 located in the spot beam area A1 moves to the spot beam area A3 while holding the connection with the radio terminal 32 located in the spot beam area A2. The radio terminal 31 signals to the repeater 1 that it is going to start movement or it has started movement through the use of such means as shown in FIG. 12, 13, or 14. The repeater 1 and the radio terminal 31 perform a set of preparation operations for movement. If, for example, the radio terminal 31 is transmitting information and conducting associated processing, then it performs a resume operation (state preserving operation) under the control of the resume controller 603. After the termination of the set of operations, the terminal starts movement.

After the radio terminal 31 has moved to the other area, a connection is set up with the state kept preserved in accordance with the same procedure as the above-described connection setup procedure. That is, the repeater 1 starts polling using the first transmitter, and the radio terminal 31 responds to this polling after the termination of movement. Thereby, the controller 30 in the repeater 1 determines a spot beam area to which the radio terminal moved, then sets up a connection.

It may be permitted, during radio terminal movement, to set up a connection other than SVC for the wide-area-beam-based radio channel and switch the information transmission channel from the spot-beam-based radio channel to the wide-area-beam-based radio channel. In general, the information transmitting capability of the wide-area-beam-based radio channel is poor in comparison with that of the spot-beam-based radio channel. However, the newly set up connection can be used for low-speed reception only during radio terminal movement. Even with the wide-area-beam-based radio channel having poor information transmitting capability, sufficient communication service could be provided.

According to the first embodiment of the present invention, as described above, the function of a conventional ATM-LAN which has been exclusively regarded as a wire LAN can be incorporated into a radio LAN, and the function unique to a radio LAN system can be effectively matched to an ATM-LAN system. That is, by establishing a hierarchy between radio channels comprised of wide and spot beams, the meta-signaling procedure in ATM communication can be performed through a common channel comprising a wide beam, and user specific channels comprising spot beams can be dedicated to information communication, permitting efficient utilization of frequencies. Moreover, even if spot beams are used to implement good transmission characteristics and high transmission rates, no restrictions are made on the movement of radio terminals because a hands-off technique and a resume facility are built in. Furthermore, since no exclusive assignment of radio resources on the terminal level is performed, variable transmission rates and multimedia communication can be accommodated even if transmission paths are shared by the use of a multi-access technique, and compatibility with a conventional wire ATM-LAN can also be maintained.

Hereinafter, other embodiments of the present invention will be described. The corresponding parts to those in the first embodiment are denoted by the same reference numerals and their detailed description will be omitted.

FIG. 16 shows a radio communication system according to a second embodiment of the present invention, which includes a first repeater device 1, a radio transmission/reception device 2, a second repeater device 3, and a backbone network 5. The first repeater 1, radio transmission/reception device 2, and second radio receiver 3 provide service areas A10, A20, and A30, respectively. The first and second repeaters 1 and 3 are arranged identically to the repeater 1 in the first embodiment shown in FIG. 3. In the present embodiment, the use of a single repeater is also permitted. Conversely, more than one radio transmission/reception device may be provided.

Figure 17:
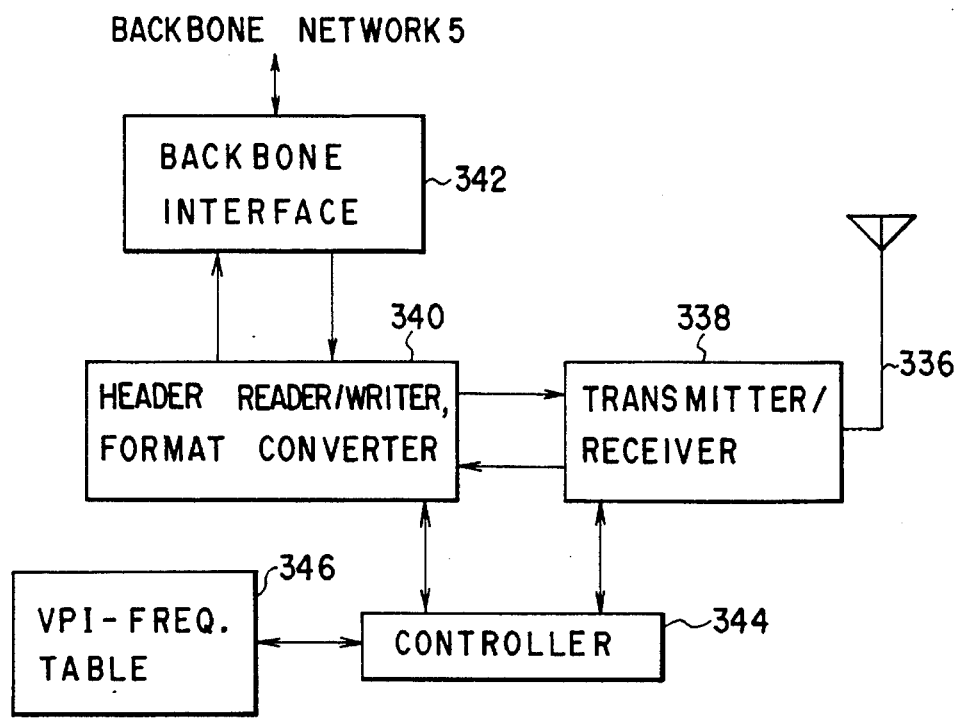
FIG. 17 is a simplified block diagram of a radio transmission/reception device used in the second embodiment of the present invention.

FIG. 17 shows an arrangement of the radio transmission/reception device 2. An antenna 336 is connected to a transmitter/receiver 338. A receive signal is applied to the backbone network 5 via a header reader/writer-format converter 340 and a backbone interface 342. To the transmitter/receiver 338 and header reader/writer-format converter 340 is connected a controller 344 to which a VPI-frequency correspondence table 346 is connected. A transmit signal from the backbone network 5 is supplied to the antenna 336 via the backbone interface 342, header reader/writer-format converter 340, and transmitter/receiver 338.

Such an arrangement permits communication between the radio terminals located in the service areas A10, A20 and A30. This means that each terminal can always receive services, such as channel setup, information transmission, etc., even if it moves from an area to another. It is essential that the radio transmission/reception device 2 provides the service area A20 similar to the service areas A10 and A30 and the same services as the repeaters 1 and 3. Supposing, for example, that the radio transmission/reception device 2 provides services to a radio terminal only for information transmission at a low rate while it is moving from an office to another, use may be made of a wide-area-beam-based radio channel as a radio channel for that service area A20. This will simplify the configuration of the whole radio communication system and provide practically sufficient communication services to a radio terminal that is moving. In addition, the information transmission system used in the radio transmission/reception device need not be limited to the ATM system. Another transmission system may also be used that is suited for transmission of data at a low rate.

Figure 18:
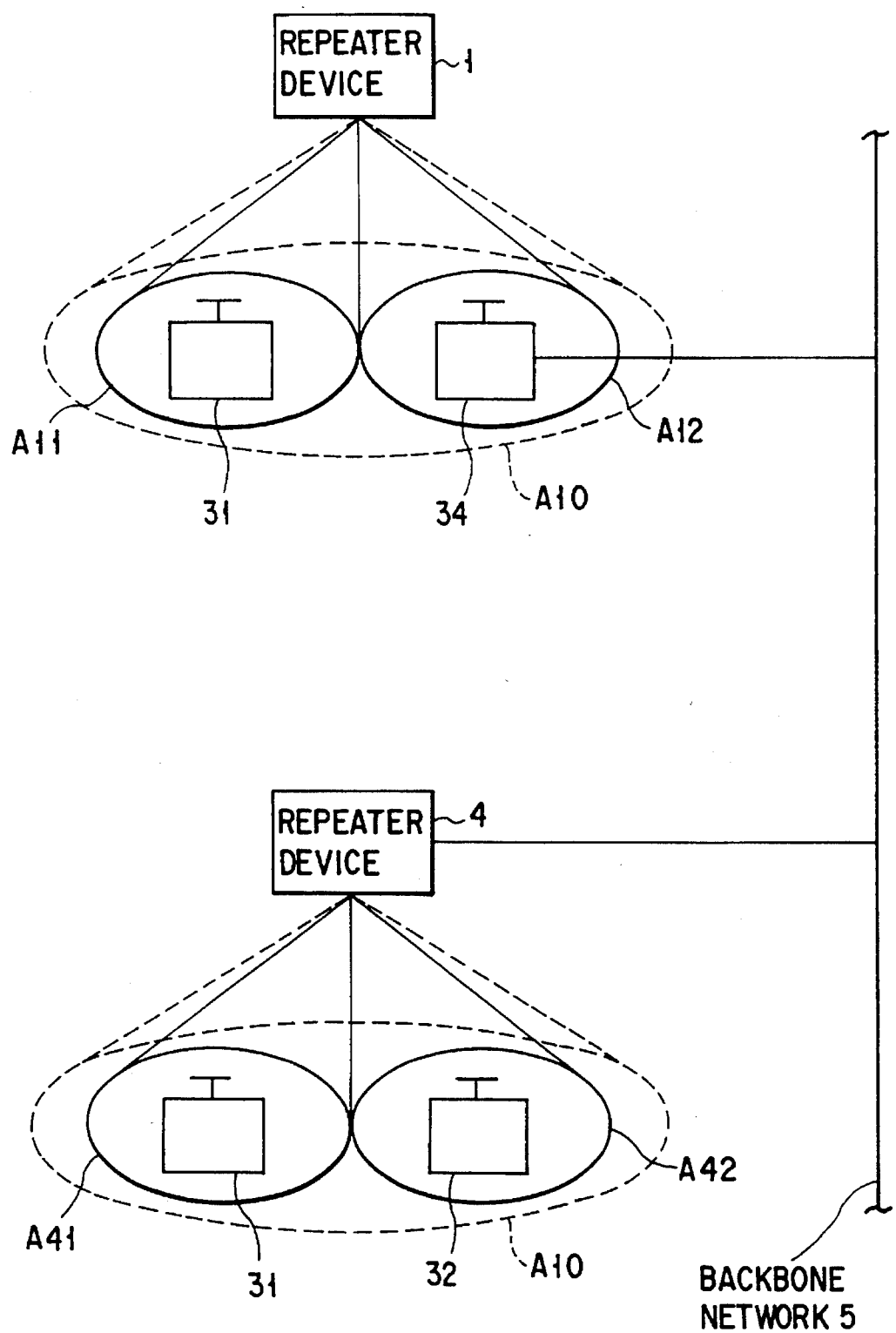
FIG. 18 shows a radio communication system according to a third embodiment of the present invention.

FIG. 18 shows a radio communication system according to a third embodiment of the present invention, which includes two repeater devices 1 and 4 that provide service areas A10 and A40, respectively. As with the first and second embodiments shown in FIGS. 3 and 16, the first repeater 1 is coupled with the backbone network 5 through the second radio terminal 34 with which the connection is set up by a radio channel. The third embodiment is distinct from the first and second embodiments in that the second repeater device 4 is directly connected to the backbone network 5.

Figure 19:
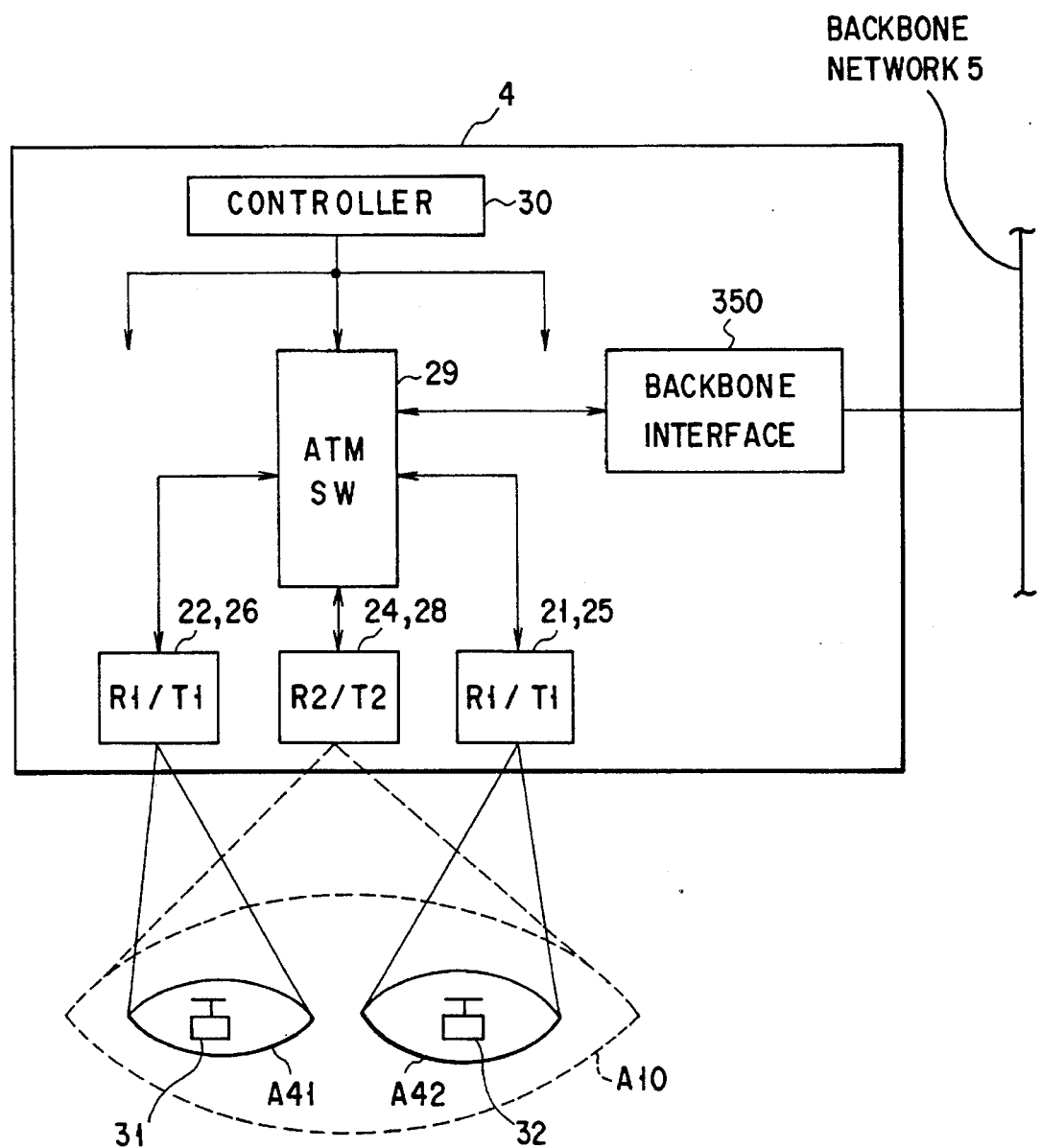
FIG. 19 is a block diagram of the second repeater in the third embodiment shown in FIG. 18.

FIG. 19 shows an arrangement of the second repeater 4 that is directly connected to the backbone network 5 via a wire channel. The radio repeater 4 comprises spot beam transmitters/receivers 21, 25; and R22, 26, a wide area beam transmitter/receiver 24, 28, an ATM switching device 29, a controller 30, and a backbone interface 350 for connecting the ATM switching device 29 to the backbone network 5. The spot beam transmitters/receivers 21, 25; and 22, 26 provide spot beams A41 and A42 within a predetermined service area which are adapted to establish radio channels. Wide area beam transmitter/receiver 24, 28 provides a wide area beam A10 within that service area for establishing a radio channel. The number of the spot beams within the service area is not limited to two.

Figure 20:
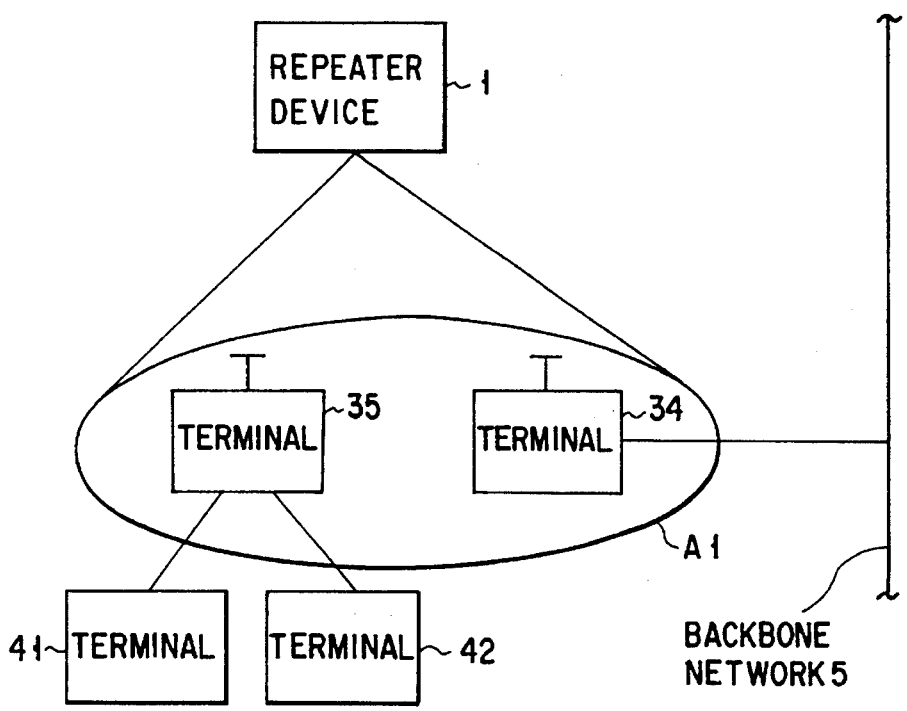
FIG. 20 shows a radio communication system according to a fourth embodiment of the present invention.

In the above-described embodiments, the radio terminals are each assigned one frequency/VPI, and each radio terminal is handled as a stand-alone device except the second radio terminal that is connected to the backbone network 5. In contrast, in an embodiment shown in FIG. 20, two or more radio terminals, for example, terminals 41 and 42, are connected physically and logically to a third radio terminal 35. Thus, the radio terminal 35 contains an operation to maintain a radio channel and a multiplex operation for processing transmit signals from the terminals 41 and 42. Each of the terminals 41 and 42 may be assigned respective individual VPI/frequency. Alternatively, each terminal may be assigned a respective individual VPI and may use a common frequency. A further modification may be made such that each terminal is assigned a respective individual VCI and a common VPI/frequency.

An arrangement of the third radio terminal 35 is illustrated in FIG. 21. An antenna 356 is connected to a transmitter/receiver 358. A receive signal is applied to the radio terminals 41 and 42 via a header reader/writer-format converter 360 and a multiplexer/demultiplexer 362. To the transmitter/receiver 358, header reader/writer-format converter 360 and multiplexer/demultiplexer 362 is connected a controller 364 with which a VPI-frequency correspondence table 366 is connected. Transmit signals from the radio terminals 41 and 42 are applied to the antenna 356 via the multiplexer/demultiplexer 362, header reader/writer-format converter 360, and transmitter/receiver 358.

In the radio communication systems of the present invention, for assignment of frequencies as radio resources, it is also important to consider how their respective bandwidth is to be assigned. Hereinafter, this point will be described.

In the above embodiments, a wide-area-beam-based radio channel is used mainly as a common control channel for the meta-signaling procedure, and a spot-beam-based radio channel is used mainly for information transmission. In general, it can be considered that the common control channel differs in transmission rate from the information transmission channel. Therefore, it is not necessarily required that the frequency bandwidth assigned to the common control channel (i.e., the bandwidth assigned to the wide-area-beam-based radio channel) and the frequency bandwidth assigned to the information control channel (i.e., the bandwidth assigned to the spot-beam-based radio channel) be the same. On the assumption that the frequency assignment is made as shown in FIG. 9, for example, the assignment of frequency bandwidth to the uplinks may be such that the bandwidth for F0U is narrower than the bandwidth for F1U, F2U, F3U, F4U. That is, it is possible to set the bandwidth assigned to a wide-area-beam-based radio channel narrower than that assigned to a spot-beam-based radio channel.

In conventional radio communication systems, the frequency bandwidth assignment is fixed because the information transmission rate is constant. In the ATM system used as the information transmission system of the present invention, however, the transmission rate is not constant, but is set dynamically, depending on a report parameter at channel setup time. In the radio communication system of the present invention which uses such a variable-transmission-rate ATM system, therefore, adaptive bandwidth assignment is considered to be effective. For example, the use of an average transmission rate parameter, a peak transmission rate parameter, etc., at channel setup time permits variable frequency bandwidth assignment.

It may be considered to make the information transmission rate vary between uplinks and downlinks. In this case, it would be effective to vary the frequency bandwidth assigned to each of the uplinks and downlinks according to their respective transmission rate parameter.

In the above embodiments, the multi-access means is supposed to be FDMA. More specifically, VPI and/or VCI, which is an identifier of an ATM cell, is made to correspond with a frequency. However, the multi-access means is not limited to FDMA. Any other multi-access means, such as TDMA, CDMA, or the like, may be used instead. Depending on the circumstances, FDMA, TDMA, CDMA, etc., may be used in combination. In that case, of course, a correspondence between radio resources, such as frequency, time, code, space, etc., and ATM cell identifiers (VPI/VCI) must be established.

Next, specific embodiments will be described about how to use other multi-access means than the multi-access means in frequency domain such as FDMA, which is taken as a basis, that is, multi-access means based on assignment of radio resources in time domain, code domain, space domain, etc. Depending on whether or not the use of the same frequency and the use of the same VPI/VCI are allowed within a spot beam area and between spot beam areas, various modifications can be made.

Before describing the specific embodiments, multi-access means based on time domain, code domain, space domain, etc. in the present invention will be described. FIG. 22 shows a correspondence between VPIs and TDMA time slots which are time-domain-based multi-access means. In this figure, uplinks are taken. And it is supposed that three VPIs, i.e., VPI1, VPI2, and VPI3, are assigned and used in a certain spot beam area. The use of time slots assigned to VPI1, VPI2, and VPI3 permits information transmission. The present invention equips a repeater with an ATM switching device, which is permitted to perform resolution into time slots essential to a normal TDMA system by the use of an arrangement which is basically the same as that of a repeater using frequency-domain-based multi-access means.

As with the VPI to frequency bandwidth assignment in frequency domain, the VPI to time slot assignment in FIG. 22 can be set dynamically by a report parameter at channel setup time. For example, time slot assignment can be made variable by the use of, for example, an average transmission rate parameter or a peak transmission rate parameter at channel setup time.

In FIG. 23, there is illustrated an embodiment which makes codes of CDMA, which is code-domain-based multi-access means, correspond with VPIs. In this figure, uplinks are taken. And it is supposed that three VPIs, i.e., VPI1, VPI2, and VPI3, are assigned and used in a certain spot beam area. As codes, three codes, C1, C2 and C3, are taken. Each of radio terminals diffuses its respective radio signal by a code assigned to itself, thereby making information transmission. A repeater compresses the diverged radio signal, then enters it into the ATM switching device. In this case, the repeater can be arranged basically identically to a repeater using the frequency-domain-based multi-access means.

The assignment of VPIs and codes in FIG. 23 can be made on the basis of a report parameter at channel setup time as with the assignment of VPIs and frequency bandwidth. Further, assignment of parameters such as code length can be made variable by an average transmission rate parameter or a peak transmission rate parameter at channel setup time.

In addition, radio resource assignment based on space domain can also be made.

The above embodiments have been described as having the directivity of spot beams (the shape of service areas) preset. As the spot beam antenna, use may be made of a variable directivity antenna. That is, when the same radio resources are used in a spot beam area, it can be avoided by varying the directivity of the spot beam antenna (varying the shape of the spot beam area). This will limit the number of radio terminals in the spot beam area. The space-region-based multi-access means can be made adaptive on the basis of a report parameter at channel setup time as with the other multi-access means.

Next, a more specific embodiment for the assignment of VPIs and radio resources will be described. FIG. 24 shows nine forms 1 through 9 as the specific embodiment. Their basic features are as follows.

(1) When an frequency overlap between spot beam areas (the same frequency is used in different spot beam areas except adjoining areas) is allowed, the frequency is changed at hands-off time. When a VPI/VCI overlap (the same VPI/VCI is used in different spot beam areas except adjoining areas) is allowed, the VPI/VCI is changed at hands-off time.

(2) When a frequency overlap or a VPI/VCI overlap is allowed in a spot beam area, each terminal uses additionally another multi-access means based on time domain, code domain or space domain. When a VPI overlap is allowed in a spot beam area, division of VCI available to each radio terminal is made. When a VCI overlap is allowed in a spot beam area, radio terminal identification is provided on a higher-level layer.

Form 1 corresponds to the above-described embodiment. That is, an inter-area frequency overlap is allowed, but no VPI overlap is allowed. This eliminates the need for a radio terminal to change VPI in moving to another area. Since there is an inter-area frequency overlap, the controller 30 assigns a new frequency to a radio terminal when it enters a new spot beam area or causes it to use another multi-access means.

Form 2 provides radio terminals with greatest freedom in radio resource assignment. A frequency overlap and VPI overlap do not exist within any spot beam area and between any spot beam areas. Thus, form 2 avoids the need for each radio terminal to change the frequency and VPI in moving to another spot beam area. A transmitter and receiver associated with a spot beam area switch their state to enable a radio terminal that is moving to that spot beam area to transmit and receive on the frequency assigned thereto.

Form 3 does not allow a frequency overlap between spot beam areas. Thus, it eliminates the need for a radio terminal to change the frequency in moving to another area. However, an inter-area VPI overlap is allowed. If, therefore, the same VPI is used in an area to which a radio terminal is moving, then that radio terminal is assigned a new VPI for communication in that area.

Form 4 allows a VPI overlap in a spot beam area. In the same area, therefore, radio terminals will compete for transmission. For this reason, the ATM switching device performs connection identification on the basis of sets of frequency and VPI. The VCI available to a radio terminal having an overlapped VPI is divided for ATM switching and VCI conversion. This form allows a VPI overlap. Thus, there is no need for changing VPI for movement from a spot beam area to another. However, to avoid the VPI overlap as much as possible, it is possible to assign an unused VPI to a radio terminal when it moves from a spot beam area to another.

Form 9 allows a frequency overlap and a VPI overlap between spot beam areas as well as within a spot beam area. This eliminates the need for a radio terminal to change the frequency and VPI in moving from an area to another. However, a frequency overlap and a VPI overlap exist within the same spot beam area, which, in order to suppress competition for transmission, allows the time-domain, code-domain or space-domain-based multi-access means and the division of VCI available to a radio terminal having an overlapped VPI for ATM switching and VCI conversion described in connection with form 3 to be carried out in combination.

In the present invention, even if a radio resource/VPI overlap exists, information transmission is possible. For better information transmission, in general, it will be permitted to make the radio resource/VPI assignment in the following manner. That is, if, when a radio resource/VPI overlap is allowed, an unused radio resource/VPI exists within a spot beam area, a radio terminal is assigned the unused resource/VPI on priority basis at channel setup time or at inter-area movement time.

According to the present invention, as described above, a repeater for providing communication services to a predetermined service area comprises spot beam transmission and reception antennas for providing radio channels based on spot beams within the service area, a wide area beam transmission and reception antenna for providing a radio channel based on a wide area beam within the service area, first transmitters connected to the spot beam transmission antennas for transmitting ATM cells, first receivers connected to the spot beam reception antennas for receiving ATM cells, a second transmitter connected to the wide area beam transmission antenna for transmitting ATM cells, a second receiver connected to the wide area beam reception antenna for receiving ATM cells, and an ATM switching device having input terminals connected to receive ATM cells from the first and second receivers and output terminals for providing ATM cells to the first and second transmitters for directing incoming ATM cells to their respective proper output terminals.

That is, the radio communication channels are hierarchized into spot-beam-based radio channels and wide-area-beam-based radio channels. Thus, a radio communication terminal can adapt itself to multimedia communication by selecting a channel according to a required information transmission rate. That is, a spot-beam-based radio channel can be used for information communication requiring a high transmission rate like image information communication, while a wide-area-beam-based radio channel can be used for information communication that permits the use of a relatively low transmission rate like voice communication. For the meta-signaling procedure needed at ATM connection setup time, the wide-area-beam-based radio channel can be used as a common control channel for meta-signaling. This permits an ATM connection to be set up for any radio terminal as long as it is located within a service area regardless of whether it is moving or not.

Moreover, by establishing a correspondence between radio resources, such as frequency, time, and code, used in multi-access techniques for radio resources, such as FDMA, TDMA, and CDMA, and VPIs/VCIs serving as ATM cell identifiers, the present invention can take over variable transmission rates of a wire ATM-LAN and the ATM feature that permit multiple connections to be set up for each terminal and can maintain compatibility with the wire ATM-LAN. In particular, a radio terminal can be implemented by simply attaching a radio section to a wire ATM-LAN terminal, which permits full utilization of the features of the wire ATM-LAN terminal with compatibility.

A correspondence between radio resources and ATM cell identifiers thus established permits channel setup, traffic control and radio resource assignment to be facilitated. In addition, the traffic control at the time a radio terminal is moving, which is important to a radio communication system, becomes easy.

Furthermore, the use of a spot beam antenna permits a spot beam to be utilized as one of radio resources in space domain, which improves compatibility with a wire ATM-LAN, facilitates channel setup, traffic control and radio resource assignment, and compensates for degradation of the characteristics of radio channels due to multipath. In addition, the present invention permits the hands-off/resume facility to be implemented readily, which permits a repeater device to know the start of movement of a radio terminal and to maintain communication with the radio terminal accordingly.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A radiocommunication system comprising:

a repeater for providing a radiocommunication service over a predetermined service area; and a radiocommunication terminal for communicating with said repeater, wherein said repeater comprises:

first communicating means for providing a radio channel by a wide beam covering the whole of said service area; and second communicating means for providing a radio channel by spot beams covering subareas within said service area, and wherein said radiocommunication terminal can be directly communicated with said first communicating means and said second communicating means.

2. A radiocommunication system according to claim 1, in which said radiocommunication terminal comprises interface means connected to a backbone network through a wire channel.

3. A radiocommunication system according to claim 1, further comprising ATM switching means connected to said first and second communicating means.

4. A radiocommunication system according to claim 3, further comprising:

storage means for storing a correspondence relationship between at least one of a virtual path identifier and a virtual channel identifier and a radio resource for a radio channel; and radio resource setup means responsive to said storage means for setting up the radio resource corresponding to at least one of said virtual path identifier and said virtual channel identifier in an ATM cell.

5. A radiocommunication system according to claim 3, further comprising:

common control channel setup means for setting up a common control channel between said repeater and said radiocommunication terminal; and meta-signaling procedure executing means for setting up respective channels between said repeater and radiocommunication terminals by using said common control channel set up by said common control channel setup means.

6. A radiocommunication system according to claim 3, further comprising:

detecting means for detecting the start of movement of said radiocommunication terminal and for signaling said repeater; and communication maintenance means for, when signaled by said detecting means, maintaining a communication between said radiocommunication terminal and said repeater even after the movement of said radiocommunication terminal.

7. A radiocommunication system according to claim 1, further comprising a second radiocommunication terminal, connected to a backbone network through a wire channel, for communicating with said repeater using an ATM cell.

8. A radiocommunication system according to claim 1, further comprising a second radiocommunication terminal, connected to wire communication terminals through a wire channel, for communicating with said repeater using an ATM cell and multiplexing signals transmitted from the wire communication terminals.

9. A radiocommunication system according to claim 1, in which said repeater comprises means for selectively activating one of said first communicating means and said second communicating means in accordance with a required information transmission rate.

10. A radiocommunication system according to claim 9, in which said means for selectively activating activates said first communicating means if the required information transmission rate is lower than a given rate and activates said second communicating means if the required information transmission rate is not lower than the given rate.

11. A radiocommunication system according to claim 1, in which said repeater comprises means for selectively activating one of said first communicating means and said second communicating means in accordance with a required information transmission bandwidth.

12. A radiocommunication system according to claim 11, in which said means for selectively activating activates said first communicating means if the required information transmission bandwidth is lower than a given bandwidth and activates said second communicating means if the required information transmission bandwidth is not lower than the given bandwidth.

13. A radiocommunication system according to claim 1, in which said second communicating means provides a radio channel for transmitting data and said first communicating means provides a radio channel for control data.

14. A radiocommunication system according to claim 13, in which said repeater activates said first communicating means to provide a radio channel for transmitting data while said radiocommunication terminal is moving.

15. A radiocommunication system according to claim 1, in which said repeater activates said first communicating means while said radiocommunication terminal is moving.

16. A radiocommunication system according to claim 1, further comprising a second radiocommunication terminal, connected to a backbone network through a wire channel, for communicating with said repeater.

17. A radiocommunication system according to claim 1, in which said repeater comprises means for activating said first communicating means for uplinks and said second communicating means for downlinks.

18. A radiocommunication system according to claim 1, in which said repeater comprises means for varying directivity of the spot beams in accordance with a required information transmission rate.

19. A radiocommunication system comprising:
- a repeater for providing a radiocommunication service over a predetermined service area;
- a first radiocommunication terminal for communicating with said repeater using an ATM cell; and
- a second radiocommunication terminal for communicating with said repeater using an ATM cell and for communicating with a backbone network via a wire channel, said repeater comprising:
- spot beam transmission antennas and spot beam reception antennas for providing radio channels within said service area by spot beams;
- a wide beam transmission antenna and a wide beam reception antenna for providing a radio channel within said service area by a wide beam;
- first transmitters and first receivers connected to said spot beam transmission antennas and said spot beam reception antennas for transmitting and receiving ATM cells;
- a second transmitter and second receiver connected to said wide beam transmission antenna and wide beam reception antenna for transmitting and receiving ATM cells; and
- ATM switching means, having input terminals connected to receive ATM cells from said first and second receivers and output terminals connected to said first and second transmitters, for directing incoming ATM cells to their respective proper output terminals.

20. A radiocommunication system according to claim 19, further comprising:
- storage means for storing a correspondence relationship between at least one of a virtual path identifier and a virtual channel identifier and a radio resource for a radio channel; and
- radio resource setup means responsive to said storage means for setting up the radio resource corresponding to at least one of said virtual path identifier and said virtual channel identifier in an ATM cell.

21. A radiocommunication system according to claim 19, further comprising:
- common control channel setup means for setting up a common control channel between said repeater and said radiocommunication terminal; and
- meta-signaling procedure executing means for executing a meta-signaling procedure between said repeater and said radiocommunication terminal by using said common control channel set up by said common control channel setup means.

22. A radiocommunication system according to claim 19, further comprising:
- detecting means for detecting the start of movement of said radiocommunication terminal and for signaling said repeater; and
- communication maintenance means for, when signaled by said detecting means, maintaining a communication between said radiocommunication terminal and said repeater even after the movement of said radiocommunication terminal.

23. A radiocommunication system according to claim 19, in which said repeater comprises means for activating said second transmitter and second receiver for uplinks and said first transmitters and first receivers for downlinks.

24. A radiocommunication system according to claim 19, in which said repeater comprises means for varying directivity of said spot beam transmission antennas and said spot beam reception antennas in accordance with a required information transmission rate.

25. A radiocommunication system comprising:
- first and second repeaters for providing communication services over different predetermined service areas;
- a radio transmitter/receiver for providing a communication service over a service area other than said predetermined service areas and communicating with a backbone network via a wire channel;
- first radiocommunication terminals for communicating with said first and second repeaters using an ATM cell and communicating with said radio transmitter/receiver; and
- second radiocommunication terminals for communicating with said first and second repeaters using an ATM cell and communicating with a backbone network, each of said first and second repeaters comprising:
- spot beam transmission antennas and spot beam reception antennas for providing radio channels within said service area by spot beams;
- a wide beam transmission antenna and a wide beam reception antenna for providing a radio channel within said service area by a wide beam;
- first transmitters and first receivers connected to said spot beam transmission antennas and said spot beam reception antennas for transmitting and receiving ATM cells;
- a second transmitter and second receiver connected to said wide beam transmission antenna and said wide beam reception antenna for transmitting and receiving ATM cells; and
- ATM switching means, having input terminals connected to receive ATM cells from said first and second receivers and output terminals connected to said first and second transmitters, for directing incoming ATM cells to their respective proper output terminals.

26. A radiocommunication system according to claim 25, in which said first and second repeaters comprises means for activating said second transmitter and second receiver for uplinks and said first transmitters and first receivers for downlinks.

27. A radiocommunication system according to claim 25, in which said repeater comprises means for varying directivity of said spot beam transmission antennas and said spot beam reception antennas in accordance with a required information transmission rate.

28. A radiocommunication system comprising:
- a repeater for providing a radiocommunication service over a predetermined service area including means for varying an assignment of radiocommunication resources in accordance with a required information transmission rate; and
- a radiocommunication terminal for communicating with said repeater using an ATM cell, said repeater comprising:

communicating means for providing a radio channel by a wide beam covering said service area and spot beams covering subareas within said service area; and ATM switching means connected to said communicating means.

29. A radiocommunication system comprising:

a repeater for providing a radiocommunication service over a predetermined service area including a first communicating means for providing a radio channel by a wide beam covering said service area; a second communicating means for providing a radio channel by spot beams covering subareas within said service area; and means for selecting one of said first communicating means and said second communicating means for an up-link and the other one for a down-link; and a radiocommunication terminal for communicating with said repeater using an ATM cell; and ATM switching means connected to said communicating means.

30. A radiocommunication system comprising:

a repeater for providing a radiocommunication service over a predetermined service area including a first communicating means for providing a radio channel by a wide beam covering said service area; a second communicating means for providing a radio channel by spot beams covering subareas within said service area; and means for selecting one of said first communicating means and said second communicating means in accordance with a required information transmission rate; and a radiocommunication terminal for communicating with said repeater using an ATM cell, ATM switching means connected to said communicating means.

31. A radiocommunication system comprising:

a repeater for providing a radiocommunication service over a predetermined service area; and a radiocommunication terminal for communicating with said repeater, said repeater comprising:

communicating means for providing a radio channel by a wide beam covering the whole of said service area and spot beams covering subareas within said service area; and means for varying an assignment of radiocommunication resources in accordance with a required information transmission rate.

32. A radiocommunication system according to claim 31, in which said radiocommunication terminal comprises means for communicating with said repeater using an ATM cell; and said repeater comprises ATM switching means connected to said communicating means.

33. A radiocommunication system according to claim 31, in which said repeater comprises:

a second communicating means for providing a radio channel by spot beams covering subareas within said service area; and means for selecting one of said communicating means and said second communicating means for an up-link and the other one for a down-link.

34. A radiocommunication system according to claim 31, in which said repeater comprises:

a second communicating means for providing a radio channel by spot beams covering subareas within said service area; and means for selecting one of said communicating means and said second communicating means in accordance with a required information transmission rate.

35. A radiocommunication system comprising:

a repeater for providing a radiocommunication service over a predetermined service area including first communicating means for providing a radio channel by a wide beam covering the whole of said service area; second communicating means for providing a radio channel by spot beams covering subareas within said service area; and means for activating said first communicating means for uplinks and said second communicating means for downlinks; and a radiocommunication terminal for communicating with said repeater using an ATM cell; and ATM switching means connected to said communicating means.

36. A radiocommunication system comprising:

a repeater for providing a radiocommunication service over a predetermined service area including means for varying directivity of the beams in accordance with a required information transmission rate; and a radiocommunication terminal for communicating with said repeater using an ATM cell, said repeater comprising:

communicating means for providing a radio channel by a wide beam covering said service area and spot beams covering subareas within said service area; and ATM switching means connected to said communicating means.

* * * * *